US012629546B2

(12) United States Patent
Scholes et al.

(10) Patent No.: US 12,629,546 B2
(45) Date of Patent: May 19, 2026

(54) VIBRATION DECOUPLER

(71) Applicant: BAE SYSTEMS plc, London (GB)

(72) Inventors: Derek Scholes, Barrow-in-Furness (GB); Alexander Grint, Barrow-in-Furness (GB); Michael Fraser, Barrow-in-Furness (GB); Paul Douglas, Barrow-in-Furness (GB)

(73) Assignee: BAE SYSTEMS PLC, London (GB)

( * ) Notice: Subject to any disclaimer, the term of this patent is extended or adjusted under 35 U.S.C. 154(b) by 653 days.

(21) Appl. No.: 18/006,256

(22) PCT Filed: Jul. 14, 2021

(86) PCT No.: PCT/GB2021/051804
§ 371 (c)(1),
(2) Date: Jan. 20, 2023

(87) PCT Pub. No.: WO2022/018408
PCT Pub. Date: Jan. 27, 2022

(65) Prior Publication Data

US 2023/0302305 A1 Sep. 28, 2023

(30) Foreign Application Priority Data

Jul. 20, 2020 (GB) ..................................... 2011136

(51) Int. Cl.
*A62B 17/04* (2006.01)
*A62B 7/12* (2006.01)
(Continued)

(52) U.S. Cl.
CPC ................ *A62B 17/04* (2013.01); *A62B 7/12* (2013.01); *A62B 18/003* (2013.01); *A62B 18/08* (2013.01); *G10K 11/162* (2013.01)

(58) Field of Classification Search
None
See application file for complete search history.

(56) References Cited

U.S. PATENT DOCUMENTS

| | | |
|---|---|---|
| 622,677 A | 4/1899 | Gallagher et al. |
| 728,476 A | 5/1903 | Langer |

(Continued)

FOREIGN PATENT DOCUMENTS

| | | |
|---|---|---|
| CN | 2624967 Y | 7/2004 |
| CN | 201182218 Y | 1/2009 |

(Continued)

OTHER PUBLICATIONS

International Search Report and Written Opinion received for PCT/GB2021/051804. Mailed: Oct. 22, 2021. 24 pages.

(Continued)

*Primary Examiner* — Bradley H Philips
(74) *Attorney, Agent, or Firm* — Arcane Law PLLC

(57) ABSTRACT

A respirator comprising: an air supply unit arranged to deliver air at its output;

headgear comprising a cradle for interfacing with a user's head, and a face covering from within which the user breathes;

a tube to receive air from the air supply unit; and a vibration decoupler, provided between the air supply unit and the head gear interface component, such that in use vibrations from the air supply and tube are reduced.

20 Claims, 13 Drawing Sheets

(51) Int. Cl.

| | |
|---|---|
| *A62B 18/00* | (2006.01) |
| *A62B 18/08* | (2006.01) |
| *G10K 11/162* | (2006.01) |

(56) References Cited

U.S. PATENT DOCUMENTS

| | | | | |
|---|---|---|---|---|
| 2,296,338 | A | 9/1942 | Dakin | |
| 2,377,122 | A | 5/1945 | Bakke | |
| 2,529,106 | A | 11/1950 | Schauweker | |
| 2,688,962 | A | 9/1954 | Summers | |
| 2,888,011 | A | 5/1959 | Penrod et al. | |
| 3,033,199 | A | 5/1962 | Jacobs | |
| 3,098,233 | A | 7/1963 | Hoagland | |
| 3,413,972 | A | 12/1968 | Depping | |
| 3,525,334 | A | 8/1970 | Braman | |
| 3,562,813 | A | 2/1971 | Origer | |
| 3,724,172 | A | 4/1973 | Wood | |
| 3,736,927 | A * | 6/1973 | Misaqi | A62B 18/006 128/201.25 |
| 3,911,914 | A | 10/1975 | Johansson | |
| 3,991,421 | A | 11/1976 | Stratten | |
| 4,127,130 | A | 11/1978 | Naysmith | |
| 4,194,247 | A * | 3/1980 | Melander | A41D 13/0025 2/457 |
| 4,236,514 | A | 12/1980 | Moretti | |
| 4,411,264 | A | 10/1983 | Jacobson | |
| 4,466,432 | A | 8/1984 | Wise | |
| 4,473,614 | A | 9/1984 | Hockmeyer | |
| 4,552,140 | A | 11/1985 | Cowley et al. | |
| 4,561,162 | A | 12/1985 | Brockway et al. | |
| 4,619,254 | A | 10/1986 | Moretti et al. | |
| 4,683,880 | A | 8/1987 | Werjefelt | |
| 5,003,973 | A | 4/1991 | Ford et al. | |
| 5,054,480 | A | 10/1991 | Bare et al. | |
| 5,113,854 | A | 5/1992 | Dosch et al. | |
| 5,188,222 | A | 2/1993 | Pierce | |
| 5,226,409 | A | 7/1993 | Bower et al. | |
| 5,394,867 | A | 3/1995 | Swann | |
| 5,549,104 | A | 8/1996 | Crump et al. | |
| 5,819,728 | A | 10/1998 | Ritchie | |
| 6,012,175 | A * | 1/2000 | Johnston | A62B 17/04 2/202 |
| 6,186,140 | B1 | 2/2001 | Hoague | |
| 6,240,567 | B1 | 6/2001 | Johnston | |
| 6,374,823 | B1 | 4/2002 | Hajianpour | |
| 6,711,748 | B2 | 3/2004 | Paris et al. | |
| 7,743,433 | B1 | 6/2010 | Grove et al. | |
| 9,038,199 | B2 | 5/2015 | Becker et al. | |
| 9,132,252 | B2 | 9/2015 | Barlow et al. | |
| 9,636,527 | B2 | 5/2017 | Steger et al. | |
| 10,603,526 | B1 | 3/2020 | Leger | |
| 2002/0073479 | A1 | 6/2002 | Epperson et al. | |
| 2003/0192103 | A1 | 10/2003 | Avery et al. | |
| 2003/0200966 | A1 | 10/2003 | Frund | |
| 2004/0216736 | A1 | 11/2004 | Lee et al. | |
| 2005/0061317 | A1 | 3/2005 | King | |
| 2005/0193472 | A1 | 9/2005 | Courtney et al. | |
| 2005/0247310 | A1 | 11/2005 | Grove et al. | |
| 2006/0048776 | A1 | 3/2006 | Cunningham et al. | |
| 2007/0095344 | A1 | 5/2007 | Abernethy | |
| 2007/0125237 | A1 | 6/2007 | Park | |
| 2008/0202509 | A1 | 8/2008 | Dillon et al. | |
| 2009/0055987 | A1 | 3/2009 | Becker et al. | |
| 2009/0151055 | A1 | 6/2009 | Duncan | |
| 2010/0108067 | A1 | 5/2010 | Walker et al. | |
| 2012/0240316 | A1 | 9/2012 | Czajka et al. | |
| 2014/0116429 | A1 * | 5/2014 | Patil | A62B 7/10 128/201.12 |
| 2014/0158134 | A1 | 6/2014 | Kenyon et al. | |
| 2015/0250234 | A1 | 9/2015 | Tuffery et al. | |
| 2017/0100613 | A1 | 4/2017 | Chessari et al. | |
| 2017/0350545 | A1 | 12/2017 | Civelek et al. | |
| 2018/0084848 | A1 | 3/2018 | Pavalarajan et al. | |
| 2018/0271196 | A1 | 9/2018 | Hussey et al. | |
| 2018/0363817 | A1 | 12/2018 | Massali | |
| 2019/0104796 | A1 | 4/2019 | Bacinska et al. | |
| 2019/0160249 | A1 | 5/2019 | Rose et al. | |
| 2019/0289946 | A1 | 9/2019 | Perusse et al. | |
| 2020/0060359 | A1 * | 2/2020 | Jascomb | A42B 3/286 |
| 2020/0060375 | A1 | 2/2020 | Jascomb et al. | |
| 2021/0195980 | A1 | 7/2021 | Cartwright et al. | |
| 2021/0308499 | A1 | 10/2021 | Gomes et al. | |
| 2021/0378323 | A1 | 12/2021 | Zamuruyev | |
| 2023/0293918 | A1 | 9/2023 | Scholes et al. | |
| 2023/0302307 | A1 | 9/2023 | Scholes et al. | |
| 2024/0091571 | A1 | 3/2024 | Fraser et al. | |

FOREIGN PATENT DOCUMENTS

| | | | | |
|---|---|---|---|---|
| CN | 104383649 | A | 3/2015 | |
| CN | 104544685 | A | 4/2015 | |
| CN | 111227415 | A | 6/2020 | |
| CN | 111418924 | A | 7/2020 | |
| DE | 202006012924 | U1 | 11/2006 | |
| DE | 202006013683 | U1 * | 12/2006 | G10K 11/16 |
| DE | 202019101502 | U1 | 4/2019 | |
| DE | 102017129469 | A1 | 6/2019 | |
| EP | 2217333 | B1 | 2/2019 | |
| FR | 2561200 | A1 | 9/1985 | |
| FR | 3056383 | A1 | 3/2018 | |
| JP | 2013127129 | A | 6/2013 | |
| JP | 5883287 | B2 * | 3/2016 | |
| KR | 20080025965 | A | 3/2008 | |
| KR | 101292903 | B1 | 8/2013 | |
| KR | 20180000473 | U | 2/2018 | |
| WO | 8300632 | | 3/1983 | |
| WO | 2008118770 | A1 | 10/2008 | |
| WO | WO2009064555 | A1 | 5/2009 | |
| WO | WO2009123809 | A2 | 10/2009 | |
| WO | WO2014031671 | A1 | 2/2014 | |
| WO | 2014183773 | A1 | 11/2014 | |
| WO | 2016196462 | A1 | 12/2016 | |
| WO | 2022018408 | A1 | 1/2022 | |

OTHER PUBLICATIONS

GB Search Report under Section 17(5) received for GB Application No. 2011136.5, dated Jan. 11, 2021. 5 pages.

* cited by examiner

VIBRATION DECOUPLER

TECHNICAL FIELD

This disclosure relates to respirators, and components of respirators including supports for air delivery components, air delivery components, and interface components that form part of an air supply conduit between an air supply unit and a piece of headgear.

BACKGROUND

Respirators of the powered air-purifying respirator (PAPR) type typically comprise two main functional components: an air supply unit that outputs a flow of breathable air, and headgear which receives the output of the air supply unit and delivers it to a user of the respirator for breathing. It is inconvenient, from an ergonomic point of view, for the air supply unit to be integrated with the headgear so as to be carried on the user's head. Therefore. In most implementations the air supply unit feeds a tube that connects to the headgear, allowing physical separation between the air supply unit and the headgear. In this arrangement the output of the air supply unit feeds the tube, and the tube feeds the headgear. The tube allows the air supply unit to be carried away from the headgear, such as on a belt at the user's waist. However, integration of the tube with the headgear poses its own ergonomic challenges. The connection should be secure, yet not impinge significantly on user comfort. The connection should further enable ergonomic onward supply of air from the tube to the user via the headgear.

SUMMARY

In one aspect there is provided a respirator comprising:

A respirator comprising:

an air supply unit arranged to deliver air at its output;

headgear comprising a cradle for interfacing with a user's head, and a face covering from within which the user breathes;

a tube to receive air from the air supply unit; wherein there is provided an interface component to receive air from the tube and to deliver said air within the face covering and a vibration decoupler, provided between the tube and the interface component, such that in use vibrations from the air supply and tube are reduced.

By provision of an interface component by which air can be delivered within the face covering, enhanced ergonomics are facilitated for the headgear. For example, embodiments are envisaged in which the tube and cradle are not integral with one another meaning that these components can be separately specified for users of the respirator having different face and head proportions.

In one example, the interface component is mounted to the cradle and to the tube. In one example, the interface component is releasably mounted to the cradle.

In one example, the interface component comprises cradle-engaging fastenings. In one example, the interface component and cradle each comprise portions of one or more fastenings, arranged to cooperate with each other to mount the interface component to the cradle.

In one example, the interface component and/or cradle comprises releasable and re-couplable fastenings, or portions of fastening elements that cooperate to releasably mount the interface component to the cradle.

In one example, the interface component is releasably mounted to the face covering. In one example, the interface component comprises a face covering fastening that further couples the interface component to the face covering. In one example, the interface component and face covering fastening are arranged to cooperate with each other to mount the interface component to the tube and the face covering.

In one example, the interface component and/or face covering comprise releasable and re-couplable fastenings, or portions of fastening elements that cooperate to releasably mount the interface component to the face covering.

In one example, the interface component comprises a frame for supporting the face covering. In one example, the interface component comprises an overhead branch and a forehead branch.

In one example, the interface component is releasably mounted to the face covering at face covering fastenings provided on the forehead branch of the interface component. In one example, the face covering fastenings provided on the forehead branch extend outwardly therefrom. In one example, a plurality of fixing bosses is provided on the forehead branch, to cooperate with the face covering and couple one to the other. In one example, the fixing bosses comprise projections, for example bulbous ended projections to button into slits, holes or corresponding openings in the face covering. In one example, the fixing bosses comprise smooth, such as generally rounded, edges and/or outer surfaces.

In one example, the forehead branch comprises an outwardly-projecting brim. In one example, the face covering fastenings of the interface component extend from the brim.

By providing fastenings or other couplings that are releasable and/or re-couplable as described, further accommodation can be made enable good ergonomics for users of the respirator with different face and head proportions. Furthermore, savings can be made when considering a range of sizes that may be required for different users, with a single interface component cooperating with a range of cradles/face coverings.

In one example, the interface component is releasably mounted to the tube. In one example, the interface component comprises tube fastenings. In one example, the interface component and tube each comprise portions of one or more tube fastenings, arranged to cooperate with each other to mount the interface component to the tube.

In one example, the interface component and/or tube comprise releasable and re-couplable fastenings, or portions of fastening elements that cooperate to releasably mount the interface component to the tube.

In one example, the interface component is releasably mounted to the tube and face covering. In one example, the interface component comprises combined face covering and tube fastenings. In one example, the interface component and tube each comprise portions of a face covering fastening, arranged to cooperate with each other to mount the interface component to the tube and the face covering together.

In one example, the interface component and/or tube comprise releasable and re-couplable fastenings, or portions of fastening elements that cooperate to releasably mount the interface component to the tube and the face covering together.

By providing fastenings or other couplings that are releasable and/or re-couplable as described, savings can be made when considering a range of sizes that may be required, and when considering the separate operational lifespan or periods between cleaning of the individual tube, cradle and face covering components, along with that of the interface component.

In one example, the cradle comprises fixings that extend away from the user's head, to which the interface component mounts. In one example, the cradle comprises fixings that extend away from the user's head, for example generally horizontally away from the users head, to which the interface component mounts.

In one example, the cradle comprises first and second laterally-extending projections at the sides thereof to form cradle-engaging fastenings, onto which the interface component mounts. In one example, the cradle comprises an adjuster, such as a size adjuster. In one example, the adjuster cooperates with a cradle-engaging fastening of the interface component to mount the interface component to the cradle.

In one example, the cradle-engaging fastening comprises a bracket that connects between the adjuster of a cradle and the interface component. In one example, the bracket comprises an angle bracket, for example a dog-leg bracket or a 90-degree angle bracket.

In one example, the interface component comprises cradle-engaging fastenings formed as apertures therethrough and is releasably mounted to the cradle by threading onto projections extending from the cradle. In one example, the interface component comprises cradle-engaging fastenings to interface with the headband at the sides and/or rear of the headband, for example at only the sides, or at only the sides and back.

In one example, the cradle comprises a headband for in use encircling the user's head in a generally horizontal plane. In one example, the projections extending from the cradle extend from the headband of the cradle. In one example, the headband comprises a webbing or lattice. In one example, the headband is releasably fastened to the cradle. In one example, the cradle, and/or the headband thereof is manufactured from a plastics material, for example a polymer. In one example, the cradle, and/or the headband thereof comprises a flexible material. In one example, the cradle, and/or the headband thereof comprises a fabric.

In one example, the face covering comprises a hood. In one example, the face covering comprises a transparent visor portion for the user the user to see through. In one example, the hood comprises a fabric material. In one example, the hood comprises a textile material, for example a non-woven textile material. In one example, the hood is manufactured from an airtight fabric. In one example, the hood comprises a polypropylene coated fabric, and/or non-woven polypropylene, or a combination of these materials.

In one example, the interface component comprises an internal conduit, to receive air from the tube at the rear the user's head and to deliver said air to the front of the user's head. In one example, the interface component passes over the user's head while located within the headgear.

In one example, the interface component is manufactured from materials such as polymers, airtight fabric plys, metals, metal alloys, and reinforced polymer composites. In one example, the interface component is manufactured from a polymer for mass production, such as for example, injection moulding. In one example, the interface component is manufactured using an additive layer manufacture technique. Additive Manufacturing (AM) (also known as Additive Layer Manufacture (ALM), 3D printing, etc.) is a process that may be used to produce functional, complex objects, layer by layer, without moulds or dies. Typically, such processes include providing material (e.g. metal or polymer) in the form of a powder or a wire. Using a powerful heat source such as a laser beam, Electron Beam (EB) or an electric or plasma welding arc, an amount of that material is melted and deposited (e.g. on a base plate of a work piece). Subsequent layers are then bult up upon each preceding layer. Vat photopolymerization. In one example, the ALM process may be material jetting, Binder jetting, Powder bed fusion, Material extrusion, Directed energy deposition, Sheet lamination The use of additive layer manufacture allows the creation of bespoke interface components units for each user, rather than tooling for one or two sizes.

In one example, the overhead branch comprises a generally arched shape, rising from the rear of the user's head, passing over the top of the user's head and down toward the user's forehead. In one example, the interface component is arranged with the headgear to run in a generally straight line from the back of the user's head, when viewed in plan. In one example, the interface component is arranged with the headgear to run along the midline of the user's head.

In one example, the overhead branch comprises a single main air conduit therethrough. In one example, the overhead branch comprises an air conduit with internal cross-section that narrows from the rear of the head toward the front, along at least a part of its length, for example at a rearward portion of its length.

In one example, the overhead branch comprises a generally round internal cross-section toward the rear thereof, such as at the back of the user's head. In one example, the overhead branch comprises a generally round external cross-section toward the rear thereof, such as at the back of the user's head. In one example, the overhead branch comprises a generally flattened internal cross-section toward the centre thereof, for example over the crown of the user's head. In one example, the overhead branch comprises a generally flattened external cross-section toward the centre thereof, for example over the crown of the user's head.

In one example, the overhead branch comprises one or more bleed holes from which air received from the tube is delivered within the face covering. In one example, the overhead branch comprises a plurality of bleed holes. In one example, the overhead branch comprises one or more bleed holes toward the rear thereof or centre thereof, for example at the back of the user's head or over the crown of the user's head. In one example, the bleed holes are provided on a portion of the overhead branch with internal cross-section that narrows from the rear of the head toward the front.

In one example, the overhead branch comprises one or more bleed holes that open toward the user's head.

In one example, the bleed holes are angled through the overhead branch so that the airflow therethrough makes an acute angle to the direction of airflow in the overhead branch. In one example, an angle of 20 to 80 degrees. In one example, an angle of 40 to 80 degrees, preferably 50 to 70 degrees. In one example, an angle of 60 degrees.

In one example, the bleed holes have an effective cross-sectional dimension of 1 mm to 10 mm, preferably 2 mm to 5 mm, such as 3 mm. In one example, the bleed holes are generally circular and have a cross sectional diameter of 1 mm to 10 mm, preferably 2 mm to 5 mm, such as 3 mm.

In one example, 1 to 20 bleed holes are provided, suitably 10 to 15, such as 12 bleed holes are provided.

In one example, the bleed holes are provided in a plurality of groups, with bleed holes in each group aligned in the direction of airflow in the overhead branch. In one example, each group comprises a row of bleed holes. In one example, three groups of bleed holes are provided. In one example, four bleed holes are provided in each group.

Bleed holes as described reduce pressure in the interface component and disrupt airflow as air passes over and there-through. In this way, a reduction in noise experienced by the user can be achieved. Also, the bleed holes may serve to cool the upper portion of the user's head, which may be less irritating than providing cooling flow elsewhere as this in many users covered with hair. (this cooling may be a bonus, not the original intention).

In one example, the overhead branch comprises a divergent portion to feed air to the forehead branch. In one example, the overhead branch comprises a fan-shaped portion to feed air to the forehead branch.

In one example, the forehead branch projects laterally away from the overhead branch. In one example, the forehead branch runs generally horizontally around the user's forehead, separate therefrom.

In one example, the forehead branch comprises one or more vents for delivery of air from the interface component within the face covering. The forehead branch delivers airflow over the face of the user. This contrasts with related systems, where the flow is generally delivered rearward of the face. In one example, the forehead branch delivers a positive airflow over the eyes, nose and mouth of the user. In one example, the forehead branch is arranged to deliver air in a generally downward direction.

In one example, the forehead branch comprises a single vent for delivery of air from the interface component within the face covering. In one example, the forehead branch is arranged to extend equally on each side of the user's face. In one example, the vent is arranged to extend equally on each side of the user's face. In one example, the forehead branch comprises an elongate vent, extending along the forehead branch, around the user's forehead. In one example, the forehead branch comprises a vent that is at least as long as the width of the nose of a user, suitably at least as long the outer edges of the eyes of a user. In one example, the forehead branch comprises a vent that is shorter than the width of the user's face, suitably shorter than the separation of the temples of the user. In one example, the vent is as long as the outer edges of the eyes of a user. In one example, the forehead branch comprises a vent that is greater than 3 mm wide, for example greater than 5 mm, for example greater than 10 mm.

In one example, the forehead branch comprises a vent provided that is generally divergent toward the open end. In one example, the forehead branch comprises a vent with a bevelled edge, the bevel providing a local divergence toward the open end of the vent. The bevelled edge may form all or part of the edge of the vent, for example along the long sides of the vent only. In one example, the vent may be wider than the end of the overhead portion. In one example, the vent may extend around the forehead, away from the extent of the end of the overhead portion. In one example, the vent may extend around the forehead, laterally away from the extent of the end of the overhead portion. In one example, the vent may comprise a main opening portion aligned with the end of the overhead portion, and one or more offset opening portions, arranged away from the main opening portion. In one example, the one or more offset opening portions are laterally offset from the main opening portion, such as forming the end or ends of the vent. In one example, the one or more offset opening portions are laterally offset from the main opening portion, such as at the end or ends of the vent further from the user's midline. In one example, two, three or a larger plurality of said vents are provided, two, three or more of which having features as described for the vent as above.

By providing a vent arrangement as described, good noise performance can be achieved, and air provided to the users facial area for breathing, while a noisy and potentially irritating direct curtain of air impinging on the users face is avoided.

In one example, the interface component is mounted to the tube such that the tube approaches the interface component in an upward direction. In one example, the interface component is mounted to the tube such that the tube approaches the interface component in a vertical direction. In one example, the interface component is mounted to the tube such that the tube approaches the interface component in a direction generally parallel to a user's back. In one example, the interface component is mounted to the tube such that the tube approaches the interface component aligned or co-linearly with a rising part of the overhead branch of the interface component.

By providing an interface which allows the tube to interact with the rest of the respirator as described, rather than by approaching horizontally for example, increased user comfort may be experienced as the weight of the tube acts on the headgear with minimal additional turning moment.

In one example, the respirator comprises a vibration decoupler. In one example, the vibration decoupler is provided between the air supply unit and the interface component, for example between the air supply unit and the tube, or between the tube and the interface component, at an intermediate position between parts of the tube, or integral with the interface component upstream from the tube.

In a preferred embodiment, the vibration decoupler is provided at one end of the tube, for example at the downstream end of the tube. By providing the vibration decoupler in this way the number of areas where movable connections between the air supply unit and the users face is reduced.

In one example, the vibration decoupler comprises a non self-supporting material. In one example, the vibration decoupler comprises a material with insignificant resistance to bending under its own weight. In one example, the vibration decoupler comprises a thin-walled section that is prone to buckling. In one example, the vibration decoupler comprises a section that is incapable of sustaining a compressive load without gross deformation.

In one example, the vibration decoupler comprises a fabric material. In one example, the vibration decoupler comprises a textile material, for example a non-woven textile material. In one example, the vibration decoupler is manufactured from an airtight fabric. In one example, the vibration decoupler comprises a polypropylene coated fabric, and/or non-woven polypropylene, or a combination of these materials. In one example, the vibration decoupler comprises the same material as the hood. In one example, the vibration decoupler comprises a tube of lower bending stiffness than the tube that otherwise connects the air supply unit with the headgear.

In one example, the vibration decoupler comprises a tube of material, such as formed from a flat pattern piece with opposed edges coupled together, for example sewn together.

In one example, the vibration decoupler comprises a tube of material is cut with perpendicular ends. In this way, attachment of the vibration decoupler to other parts of the respirator is facilitated through ease of alignment.

In one example, the vibration decoupler is arranged to lie at the rear of the body of a user, for example, down the back of the neck or the user or down the back of the user. In one example, the vibration decoupler is arranged to lie on the user's midline.

In one example, the vibration decoupler is mounted to the tube such that the tube approaches in an upward direction in use. In one example, the vibration decoupler is mounted to the tube such that the tube approaches in a vertical direction. In one example, the vibration decoupler is mounted to the tube such that the tube approaches in a direction generally parallel to the back of a user. In one example, the vibration decoupler is mounted to the tube such that the tube approaches co-linearly therewith.

In one example, the vibration decoupler cooperates with a stabiliser to hold the tube and headgear in fixed arrangement relative to one another. In one example, the tube and/or vibration decoupler cooperate with a stabiliser provided on the headgear, for example in the form of a loop incorporated onto the hood. A stabiliser for the vibration decoupler and/or tube reduce swaying of these components as the user moves, thereby increasing user comfort.

In one example, the vibration decoupler comprises a stent to prevent collapse thereof in use. In one example, the vibration decoupler comprises an internal spacer arrangement to prevent collapse thereof in use. Suitably, the stent or spacer is provided in the vibration decoupler so as not to directly contact the elements upstream or downstream thereof.

In one example the vibration decoupler comprises an external support, such as, for example a cage, lattice, elongate splines, to prevent twisting or kinking of the non self-supporting material vibration decoupler.

In one example the vibration decoupler may be engaged with the tube and interface component by tube fastening elements. The tube fastening elements at both ends of the vibration decoupler may be linked, by the external support, to prevent twisting, flexing or collapsing of the non self-supporting material vibration decoupler.

By providing a vibration decoupler, vibration from the air supply unit and/or tube is not passed through the respirator to the user, meaning that the respirator is quieter for the user.

In one example, the vibration decoupler comprises offset first and second ends. In one example, the vibration decoupler comprises a first end that is not perpendicular to its length, and/or a second end that is not perpendicular to its length. In one example, the vibration decoupler is a rhombus or parallelogram shape, when laid flat. In one example, the position and/or angle of the ends of the vibration decoupler are arranged such that the downstream and upstream components are in use offset from one another.

By offsetting the downstream and upstream components, for example by using the vibration decoupler to space the tube further from the user's back than the rearward extent of the headgear/interface component, user comfort may be enhanced by freeing up space near the user's neck to allow the head and neck to move.

In a further aspect there is provided the use of a vibration decoupler in a respirator assembly, which comprises an interface component arrangeable in use to receive air from an air supply tube of the respirator and to delver said air within a face covering of the respirator, wherein said vibration decoupler reduces vibrational noise from the tube and air supply to the interface component.

In a further aspect there is provided an interface component for a respirator, the interface component arranged in use to receive air from an air supply tube of the respirator and to deliver said air within a face covering of the respirator.

In one aspect there is provided an interface component, as described with respect to the respirator set out above.

In one example, the respirator comprises headgear comprising a cradle for interfacing with a user's head, and a face covering from within which the user breathes.

In one example, the interface component is arranged in use to be mounted to the cradle and to the tube. In one example, the interface component is in use releasably mounted to the cradle.

In one example, the interface component comprises cradle-engaging fastenings. In one example, the interface component and cradle each comprise portions of one or more fastenings, arranged to cooperate with each other to in use mount the interface component to the cradle.

In one example, the interface component and/or cradle comprises releasable and re-couplable fastenings, or portions of fastening elements that cooperate to releasably mount the interface component to the cradle in use.

In one example, the interface component is arranged to be releasably mounted to the face covering in use. In one example, the interface component comprises a face covering fastening that further couples the interface component to the face covering in use. In one example, the interface component and face covering fastening are arranged to cooperate with each other to mount the interface component to the tube and the face covering in use.

In one example, the interface component and/or face covering comprise releasable and re-couplable fastenings, or portions of fastening elements that cooperate to releasably mount the interface component to the face covering in use.

In one example, the interface component comprises a frame for supporting the face covering in use. In one example, the interface component comprises an overhead branch and a forehead branch.

In one example, the interface component is in use releasably mounted to the face covering at face covering fastenings provided on the forehead branch of the interface component. In one example, the face covering fastenings provided on the forehead branch extend outwardly therefrom. In one example, a plurality of fixing bosses is provided on the forehead branch, to cooperate with the face covering and couple one to the other. In one example, the fixing bosses comprise projections, for example bulbous ended projections to button into slits, holes or corresponding openings in the face covering. In one example, the fixing bosses comprise smooth, such as generally rounded, edges and/or outer surfaces.

In one example, the forehead branch comprises an outwardly-projecting brim. In one example, the face covering fastenings of the interface component extend from the brim.

In one example, the interface component is in use releasably mounted to the tube. In one example, the interface component comprises tube fastenings. In one example, the interface component and tube each comprise portions of one or more tube fastenings, arranged to cooperate with each other to mount the interface component to the tube in use.

In one example, the interface component and/or tube comprise releasable and re-couplable fastenings, or portions of fastening elements that cooperate to releasably mount the interface component to the tube in use.

In one example, the interface component is releasably mounted to the tube and face covering in use. In one example, the interface component comprises combined face covering and tube fastenings. In one example, the interface component and tube each comprise portions of a face covering fastening, arranged to cooperate with each other to mount the interface component to the tube and the face covering together in use.

In one example, the interface component and/or tube comprise releasable and re-couplable fastenings, or portions of fastening elements that cooperate to releasably mount the interface component to the tube and the face covering together in use.

In one example, the cradle comprises an adjuster that cooperates with a cradle-engaging fastening of the interface component to mount the interface component to the cradle in use.

In one example, the cradle-engaging fastening comprises a bracket that connects between the adjuster of a cradle and the interface component in use. In one example, the bracket comprises an angle bracket, for example a dog-leg bracket or a 90-degree angle bracket.

In one example, the interface component comprises cradle-engaging fastenings formed as apertures therethrough and is releasably mounted to the cradle in use by threading onto projections extending from the cradle. In one example, the interface component comprises cradle-engaging fastenings to in use interface with the headband at the sides and/or rear of the headband, for example at only the sides, or at only the sides and back.

In one example, the interface component comprises an internal conduit, to in use receive air from the tube at the rear the user's head and to deliver said air to the front of the users head. In one example, in use the interface component passes over the users head while located within the headgear.

In one example, the interface component is manufactured from materials such as polymers, airtight fabric plys, metals, metal alloys, and reinforced polymer composites. In one example, the interface component is manufactured from a polymer for mass production, such as for example, injection moulding. In one example, the interface component is manufactured using an additive layer manufacture technique. Additive Manufacturing (AM) (also known as Additive Layer Manufacture (ALM), 3D printing, etc.) is a process that may be used to produce functional, complex objects, layer by layer, without moulds or dies. Typically, such processes include providing material (e.g. metal or polymer) in the form of a powder or a wire. Using a powerful heat source such as a laser beam, Electron Beam (EB) or an electric or plasma welding arc, an amount of that material is melted and deposited (e.g. on a base plate of a work piece). Subsequent layers are then built up upon each preceding layer. Vat photopolymerization. In one example, the ALM process may be material jetting, Binder jetting, Powder bed fusion, Material extrusion, Directed energy deposition, Sheet lamination The use of additive layer manufacture allows the creation of bespoke interface components units for each user, rather than tooling for one or two sizes.

In one example, the overhead branch comprises a generally arched shape, rising from the rear of the users head, passing over the top of the users head and down toward the user's forehead in use. In one example, the interface component is arranged in use with the headgear to run in a generally straight line from the back of the users head, when viewed in plan. In one example, the interface component is arranged with the headgear to run along the midline of the users head in use.

In one example, the overhead branch comprises a single main air conduit therethrough. In one example, the overhead branch comprises an air conduit with internal cross-section that narrows from the rear of the head toward the front, along at least a part of its length, for example at a rearward portion of its length.

In one example, the overhead branch comprises a generally round internal cross-section toward the rear thereof, such as at the back of the users head in use. In one example, the overhead branch comprises a generally round external cross-section toward the rear thereof, such as at the back of the users head in use. In one example, the overhead branch comprises a generally flattened internal cross-section toward the centre thereof, for example over the crown of the users head in use. In one example, the overhead branch comprises a generally flattened external cross-section toward the centre thereof, for example over the crown of the users head in use.

In one example, the overhead branch comprises one or more bleed holes from which air received from the tube is delivered within the face covering. In one example, the overhead branch comprises a plurality of bleed holes. In one example, the overhead branch comprises one or more bleed holes toward the rear thereof or centre thereof, for example at the back of the users head or over the crown of the users head in use. In one example, the bleed holes are provided on a portion of the overhead branch with internal cross-section that narrows from the rear of the head toward the front.

In one example, the overhead branch comprises one or more bleed holes that open toward the users head in use.

In one example, the bleed holes are angled through the overhead branch so that the airflow therethrough makes an acute angle to the direction of airflow in the overhead branch. In one example, an angle of 20 to 80 degrees. In one example, an angle of 40 to 80 degrees, preferably 50 to 70 degrees. In one example, an angle of 60 degrees.

In one example, the bleed holes have an effective cross-sectional dimension of 1 mm to 10 mm, preferably 2 mm to 5 mm, such as 3 mm. In one example, the bleed holes are generally circular and have a cross sectional diameter of 1 mm to 10 mm, preferably 2 mm to 5 mm, such as 3 mm.

In one example, 1 to 20 bleed holes are provided, suitably 10 to 15, such as 12 bleed holes are provided.

In one example, the bleed holes are provided in a plurality of groups, with bleed holes in each group aligned in the direction of airflow in the overhead branch. In one example, each group comprises a row of bleed holes. In one example, three groups of bleed holes are provided. In one example, four bleed holes are provided in each group.

In one example, the overhead branch comprises a divergent portion to feed air to the forehead branch. In one example, the overhead branch comprises a fan-shaped portion to feed air to the forehead branch.

In one example, the forehead branch projects laterally away from the overhead branch. In one example, the forehead branch runs generally horizontally around the users forehead in use, separate therefrom.

In one example, the forehead branch comprises one or more vents for delivery of air from the interface component within the face covering in use the forehead branch in use delivers airflow over the users face. This contrasts with related systems, where the flow is generally delivered rearward of the face. In one example, the forehead branch delivers a positive airflow over the eyes, nose and mouth of the user in use. In one example, the forehead branch is arranged to in use deliver air in a generally downward direction.

In one example, the forehead branch comprises a single vent for delivery of air from the interface component within the face covering in use. In one example, the forehead branch is arranged to in use extend equally on each side of the user's face. In one example, the vent is arranged to in use extend equally on each side of the users face. In one example, the forehead branch comprises an elongate vent, extending along the forehead branch, around the users forehead in use. In one example, the forehead branch comprises a vent that is at least as long as the width of the nose of a user, suitably at least as long the outer edges of the eyes of a user. In one example, the forehead branch comprises a vent that is shorter than the width of the user's face, suitably shorter than the separation of the temples of the user. In one example, the vent is as long as the outer edges of the eyes of a user. In one example, the forehead branch comprises a vent that is greater than 3 mm wide, for example greater than 5 mm, for example greater than 10 mm.

In one example, the forehead branch comprises a vent provided that is generally divergent toward the open end. In one example, the forehead branch comprises a vent with a bevelled edge, the bevel providing a local divergence toward the open end of the vent. The bevelled edge may form all or part of the edge of the vent, for example along the long sides of the vent only. In one example, the vent may be wider than the end of the overhead portion. In one example, the vent may extend around the forehead, away from the extent of the end of the overhead portion. In one example, the vent may extend around the forehead, laterally away from the extent of the end of the overhead portion. In one example, the vent may comprise a main opening portion aligned with the end of the overhead portion, and one or more offset opening portions, arranged away from the main opening portion. In one example, the one or more offset opening portions are laterally offset from the main opening portion, such as forming the end or ends of the vent. In one example, the one or more offset opening portions are laterally offset from the main opening portion, such as at the end or ends of the vent further from the user's midline. In one example, two, three or a larger plurality of said vents are provided, two, three or more of which having features as described for the vent as above.

In one example, the interface component is in use mounted to the tube such that the tube approaches the interface component in an upward direction. In one example, the interface component is in use mounted to the tube such that the tube approaches the interface component in a vertical direction. In one example, the interface component is in use mounted to the tube such that the tube approaches the interface component in a direction generally parallel to a user's back. In one example, the interface component is in use mounted to the tube such that the tube approaches the interface component co-linearly with a rising part of the overhead branch of the interface component.

In one aspect there is provided a vibration decoupler for a respirator, the vibration decoupler arranged in use between an air supply unit and a face covering of the respirator.

In one aspect there is provided a vibration decoupler, as described with respect to the respirator set out above.

In one example, the vibration decoupler is arranged in use between the air supply unit and an interface component, for example between the air supply unit and the tube, or between the tube and the interface component, at an intermediate position between parts of the tube, or integral with the interface component upstream from the tube.

In one example, the vibration decoupler is provided at one end of the tube, for example at the downstream end of the tube.

In one example, the vibration decoupler comprises a non self-supporting material. In one example, the vibration decoupler comprises a material with insignificant resistance to bending under its own weight. In one example, the vibration decoupler comprises a thin-walled section that is prone to buckling. In one example, the vibration decoupler comprises a section that is incapable of sustaining a compressive load without gross deformation.

In one example, the vibration decoupler comprises a fabric material. In one example, the vibration decoupler comprises a textile material, for example a non-woven textile material. In one example, the vibration decoupler is manufactured from an airtight fabric. In one example, the vibration decoupler comprises a polypropylene coated fabric, and/or non-woven polypropylene, or a combination of these materials. In one example, the vibration decoupler comprises the same material as the hood. In one example, the vibration decoupler comprises a tube of lower bending stiffness than the tube that otherwise connects the air supply unit with the headgear.

In one example, the vibration decoupler comprises a tube of material, such as formed from a flat pattern piece with opposed edges coupled together, for example sewn together.

In one example, the vibration decoupler comprises a tube of material is cut with perpendicular ends.

In one example, the vibration decoupler is arranged in use to lie at the rear of the body of a user, for example, down the back of the neck or the user or down the back of the user. In one example, the vibration decoupler is arranged in use to lie on the user's midline.

In one example, the vibration decoupler is in use mounted to the tube such that the tube approaches in an upward direction in use. In one example, the vibration decoupler is in use mounted to the tube such that the tube approaches in a vertical direction. In one example, the vibration decoupler is in use mounted to the tube such that the tube approaches in a direction generally parallel to the back of a user. In one example, the vibration decoupler is in use mounted to the tube such that the tube approaches co-linearly therewith.

In one example, the vibration decoupler in use cooperates with a stabiliser to hold the tube and headgear in fixed arrangement relative to one another. In one example, the tube and/or vibration decoupler in use cooperate with a stabiliser provided on the headgear, for example in the form of a loop incorporated onto the hood.

In one example, the vibration decoupler comprises a stent to prevent collapse thereof in use. In one example, the vibration decoupler comprises an internal spacer arrangement to prevent collapse thereof in use. Suitably, the stent or spacer is provided in the vibration decoupler so as not to directly contact the elements upstream or downstream thereof.

In one example, the vibration decoupler comprises offset first and second ends. In one example, the vibration decoupler comprises a first end that is not perpendicular to its length, and/or a second end that is not perpendicular to its length. In one example, the vibration decoupler is a rhombus or parallelogram shape, when laid flat. In one example, the position and/or angle of the ends of the vibration decoupler are arranged such that in use the downstream and upstream components are in use offset from one another.

In one aspect there is provided headgear, as described with respect to the respirator set out above.

In one aspect there is provided a kit of parts for a respirator, the respirator comprising one or more of: an air supply unit arranged to deliver air at its output; headgear comprising a cradle for interfacing with a user's head, and a face covering from within which the user breathes; a tube to receive air from the air supply unit; and an interface component to receive air from the tube and to deliver said air within the face covering.

In one example, one or more of the components of the kit are as described with respect to the respirator set out above.

In one aspect there is provided a method of assembling a respirator that comprises interface component arrangeable in use to receive air from an air supply tube of the respirator and to deliver said air within a face covering of the respirator, wherein the method comprises releasably mounting the interface component.

In one aspect the method is performed with an interface component as described with respect to the respirator set out above. In one example, the respirator comprises headgear comprising a cradle for interfacing with a users head, and a face covering from within which the user breathes.

In one example, the method comprises releasably mounting the interface component to the cradle. In one example, the method comprises releasably mounting the interface component to the cradle and to the tube.

In one example, the interface component and cradle each comprise portions of one or more fastenings that cooperate with one another, and the method comprises releasably mounting the interface component to the cradle by said fastenings.

In one example, the interface component and cradle each comprise portions of one or more fastenings that cooperate with one another, and the method further comprises releasing and recoupling said fastenings to mount the interface component to the cradle.

In one example, the method comprises releasably mounting the interface component to the face covering. In one example, the interface component comprises a face covering fastening and the method comprises releasably mounting the interface component to the face covering thereby. In one example, the method comprises releasably mounting the interface component to the tube and the face covering.

In one example, the interface component and/or face covering comprise releasable and re-couplable fastenings, or portions of fastening elements and the method further comprises releasing and recoupling said fastenings to mount the interface component to the face covering.

In one example the method comprises selecting an interface component for use in the respirator from a range of possible sizes of interface components, and selecting a face covering of the respirator from range of possible sizes of face coverings, wherein the range of possible sizes of face coverings comprises a smaller number of size options than the number of possible size options of interface components.

According to the present invention, there are provided apparatus and methods as set forth in the appended claims. Other features will be apparent from the statements above and the description which follows.

BRIEF INTRODUCTION TO THE FIGURES

For a better understanding of the invention, and to show how embodiments of the same may be carried into effect, reference will now be made, byway of example, to the accompanying diagrammatic drawings in which.

DESCRIPTION OF EXAMPLE EMBODIMENTS

Figure 1:
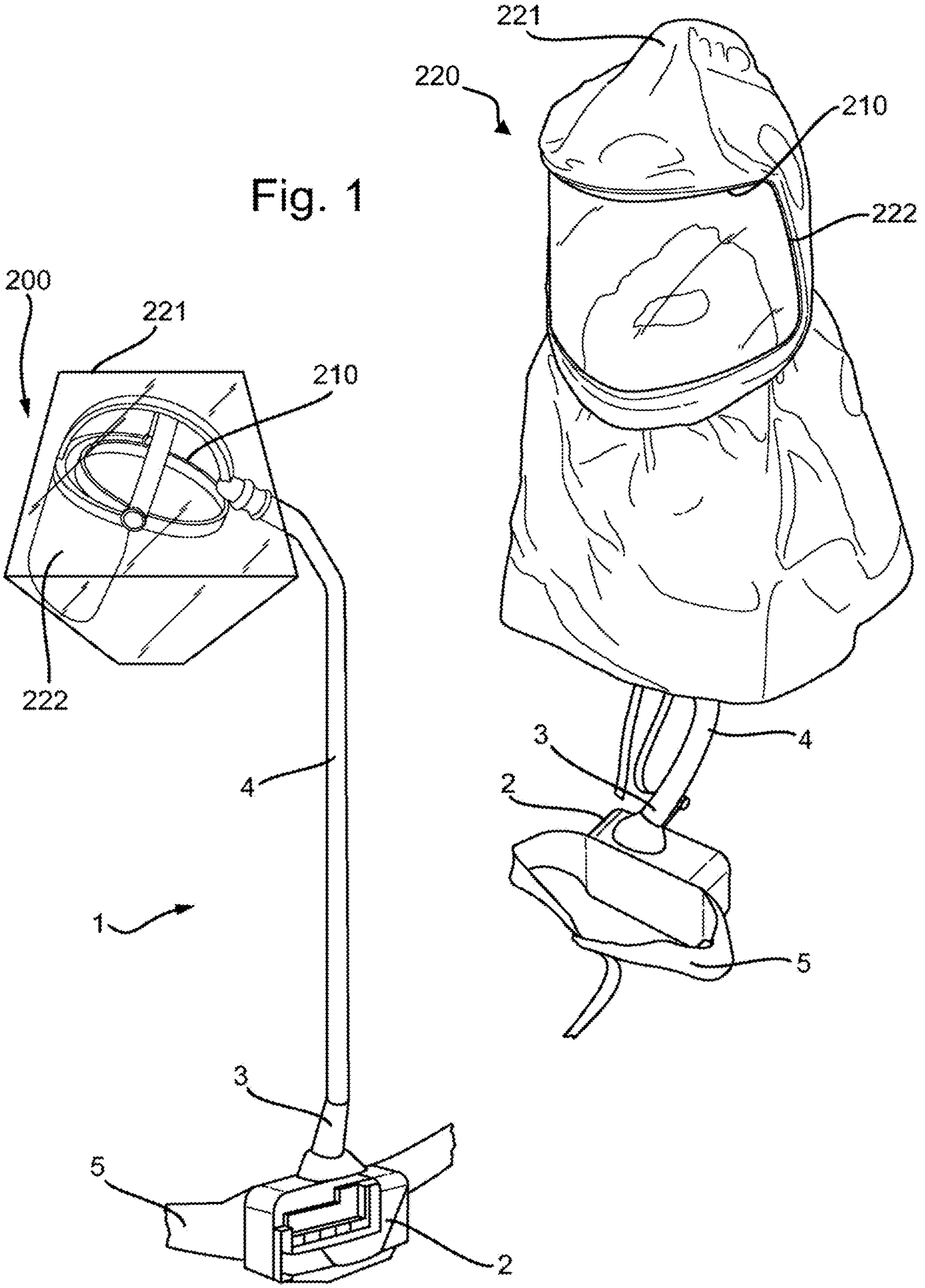
FIG. 1 shows a schematic overview of a respirator according to an example embodiment.
Figure 2:
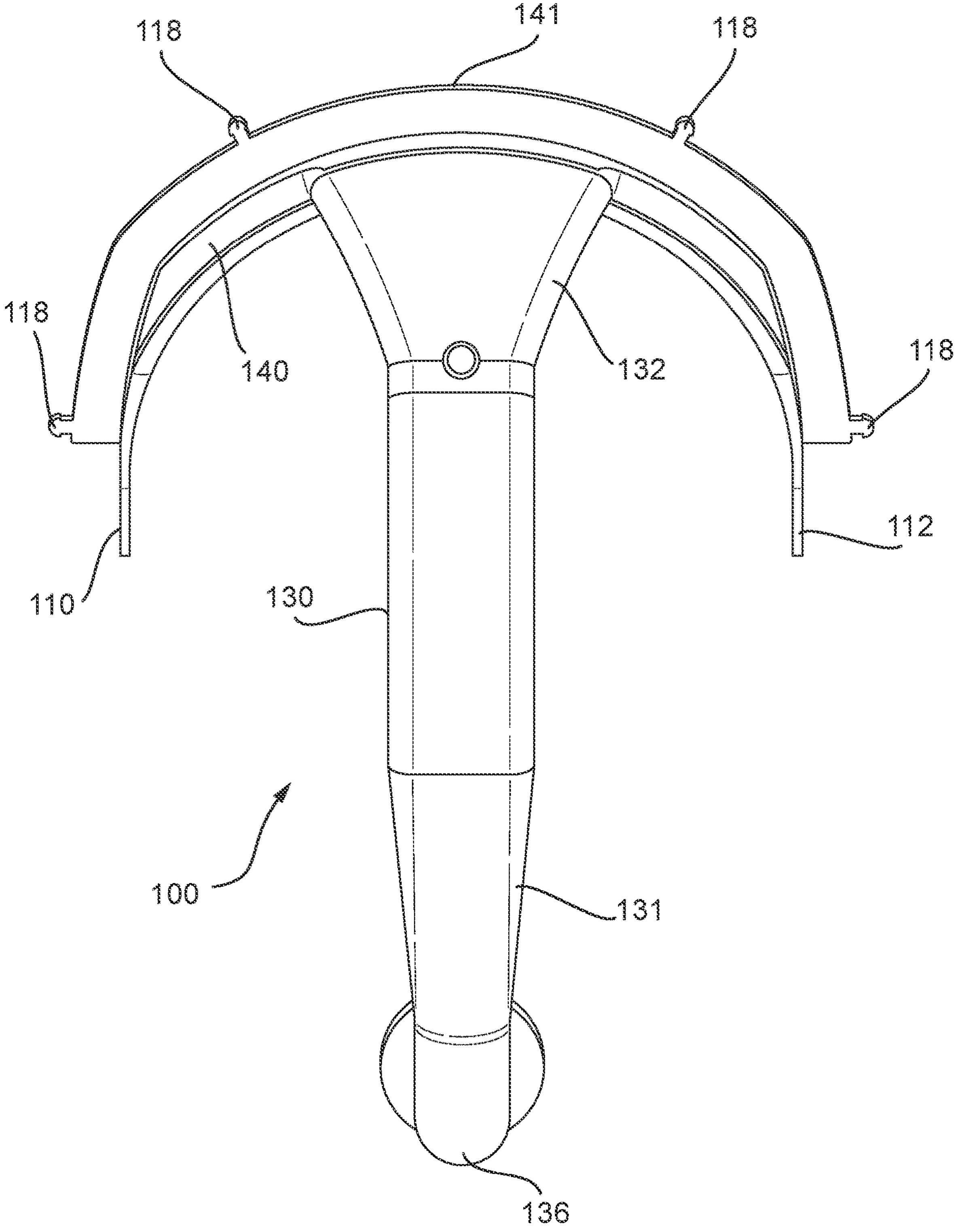
FIG. 2 shows an intermediate component according to an example embodiment, viewed from above.
Figure 3:
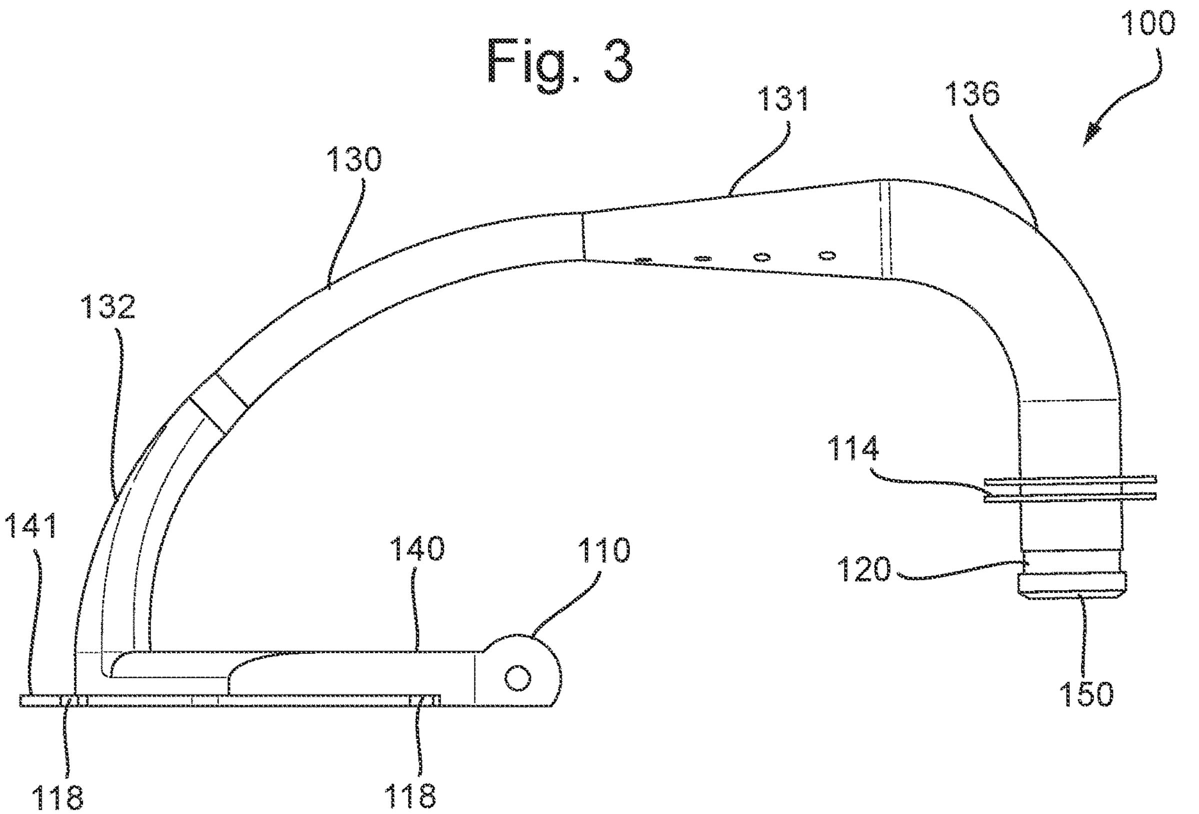
FIG. 3 shows the intermediate component of FIG. 2, viewed from a first side.
Figure 4:
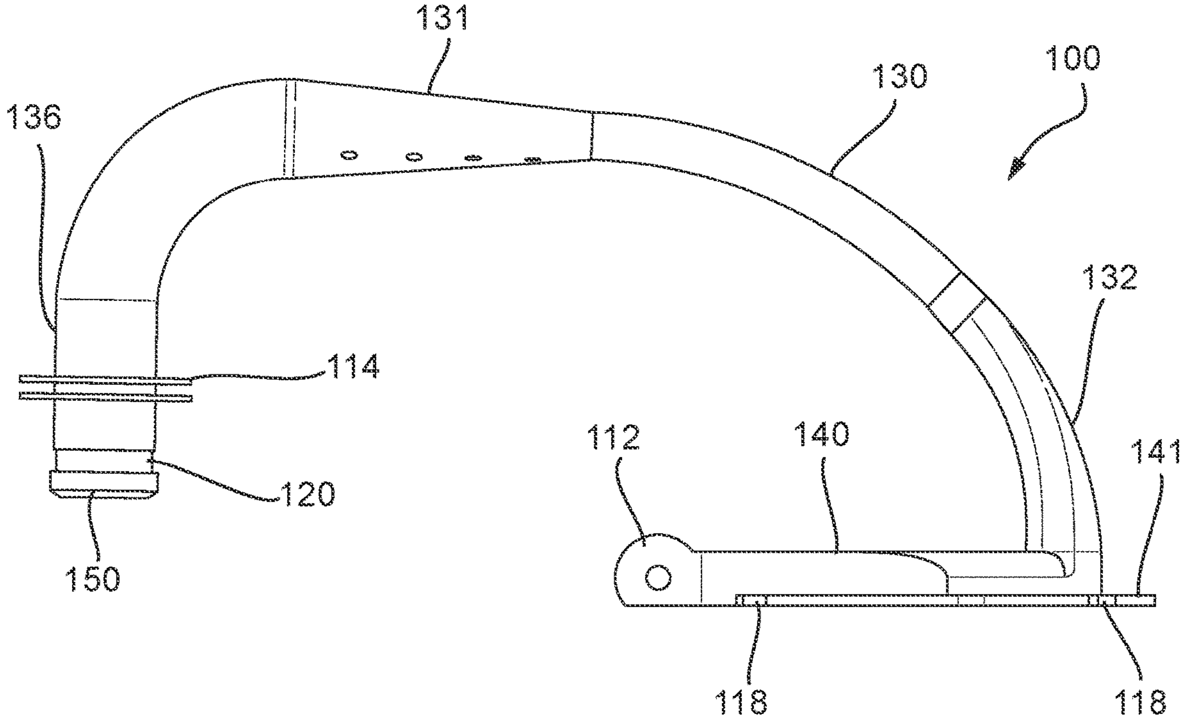
FIG. 4 shows the intermediate component of FIG. 2, viewed from a second side.
Figure 5:
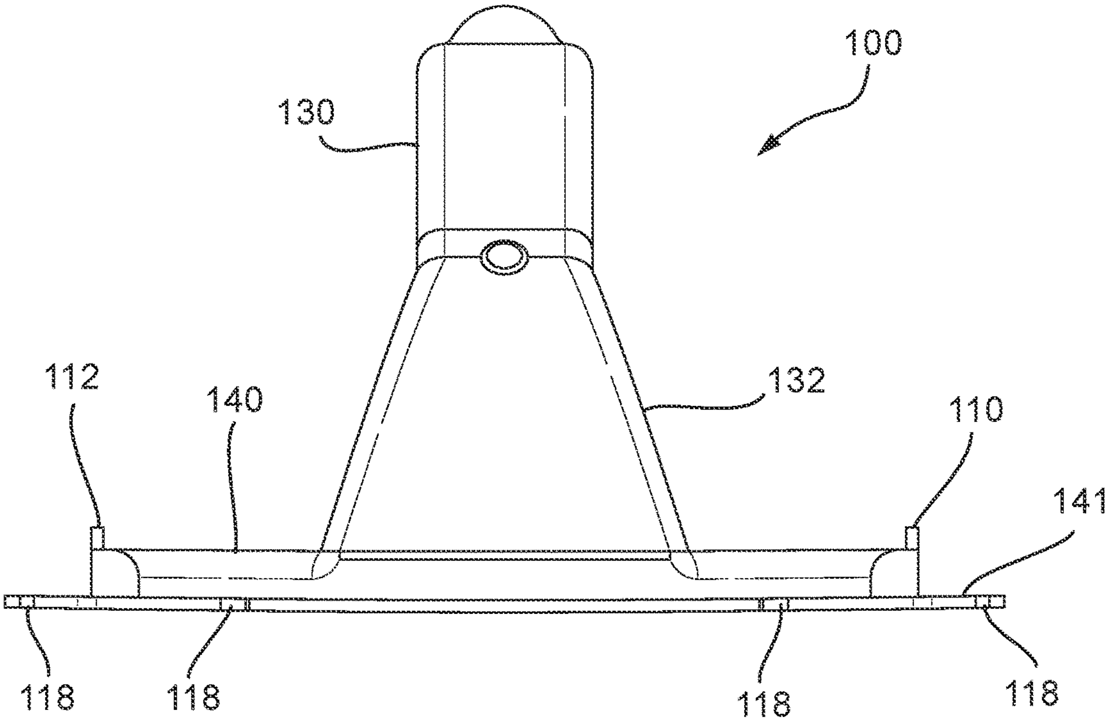
FIG. 5 shows the intermediate component of FIG. 2, viewed from the front.
Figure 6:
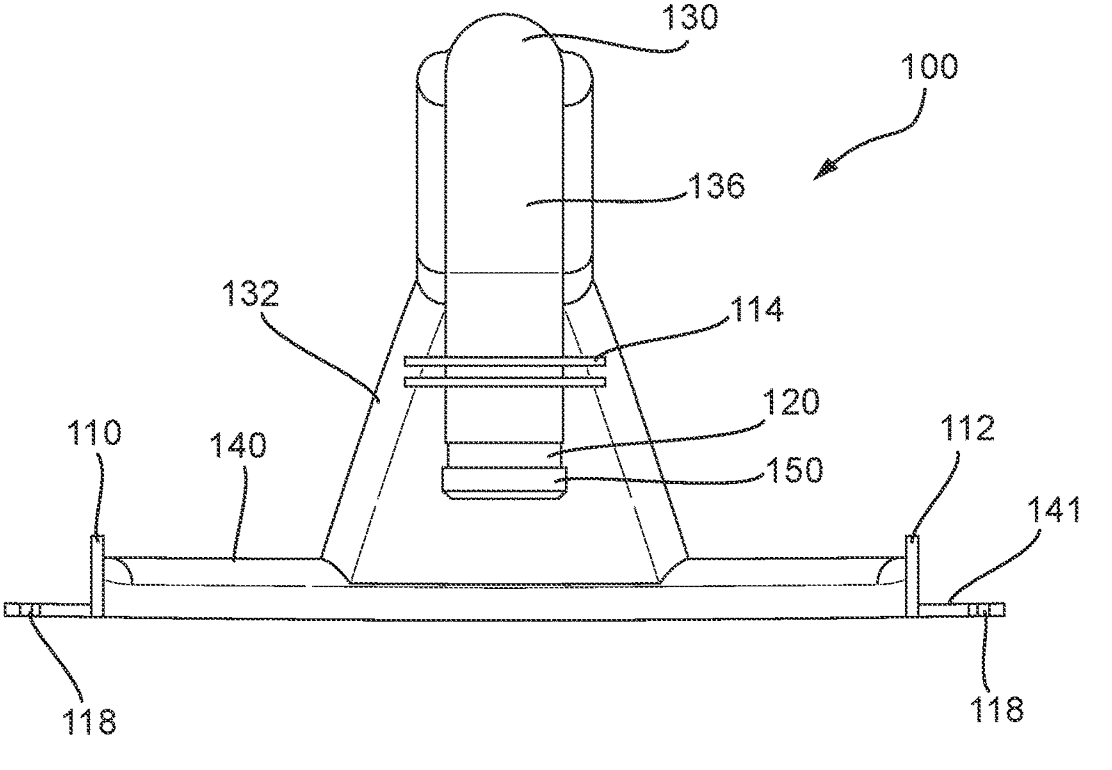
FIG. 6 shows the intermediate component of FIG. 2, viewed from the rear.
Figure 7:
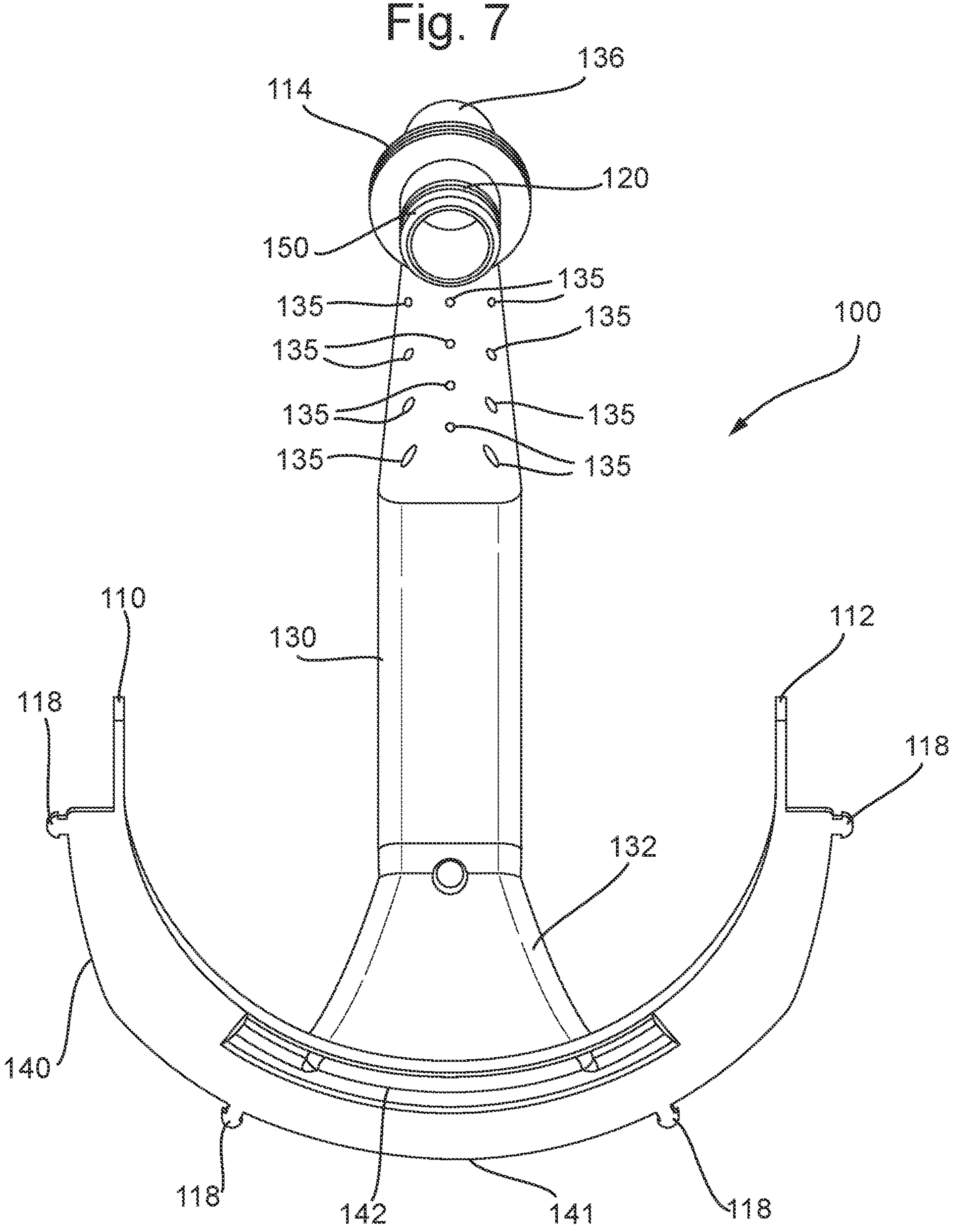
FIG. 7 shows the intermediate component of FIG. 2, viewed from below.
Figure 8:
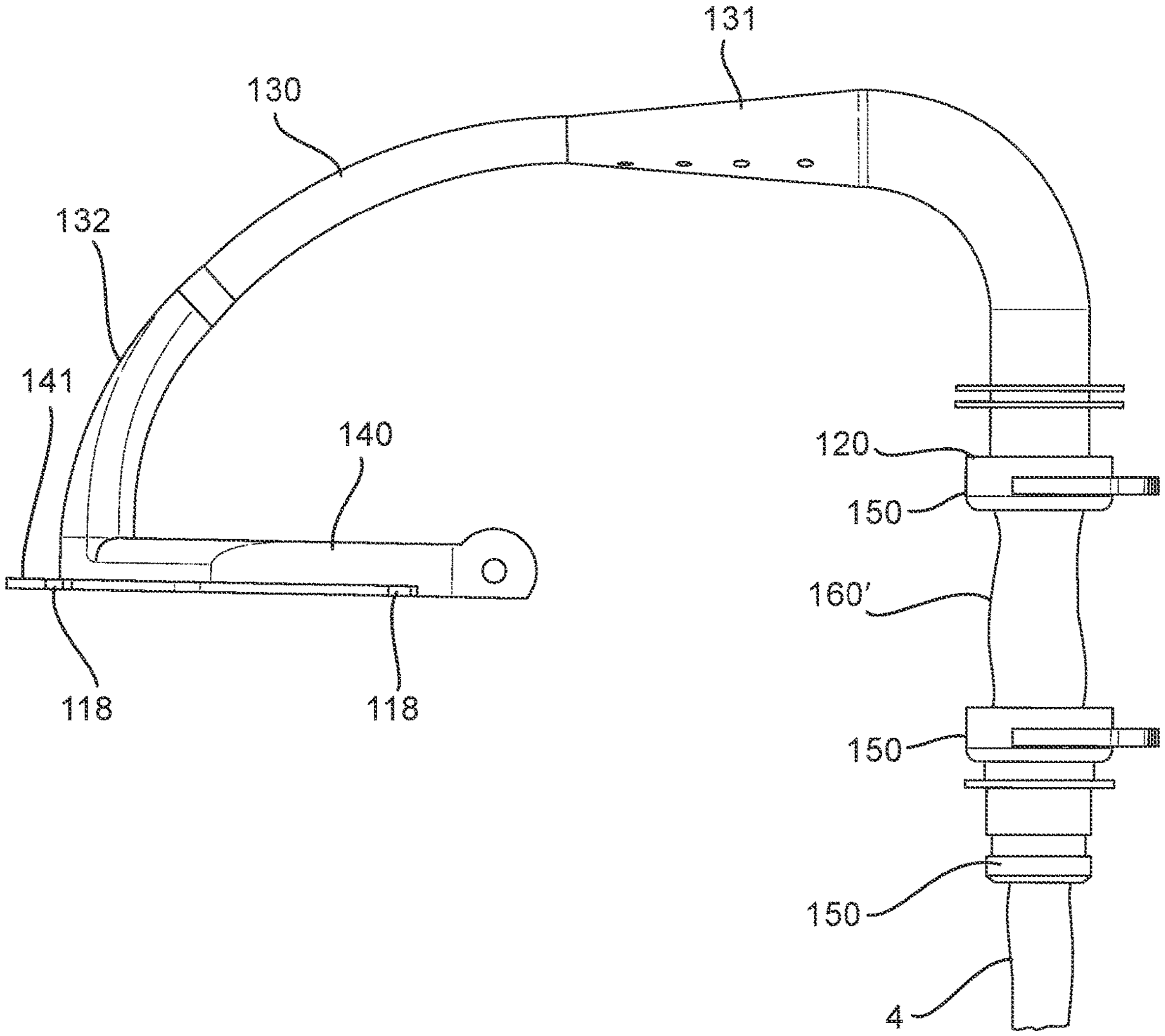
FIG. 8 shows an intermediate component according to another example embodiment, viewed from a first side.
Figure 9:
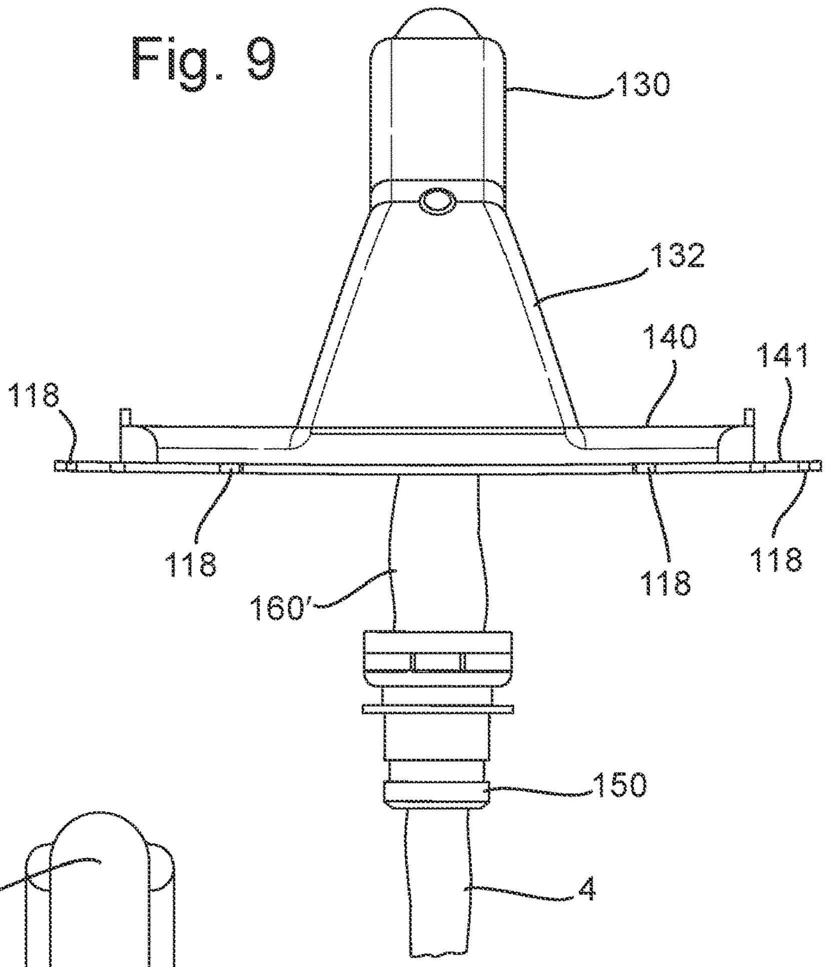
FIG. 9 shows the intermediate component of FIG. 8, viewed from the front.
Figure 10:
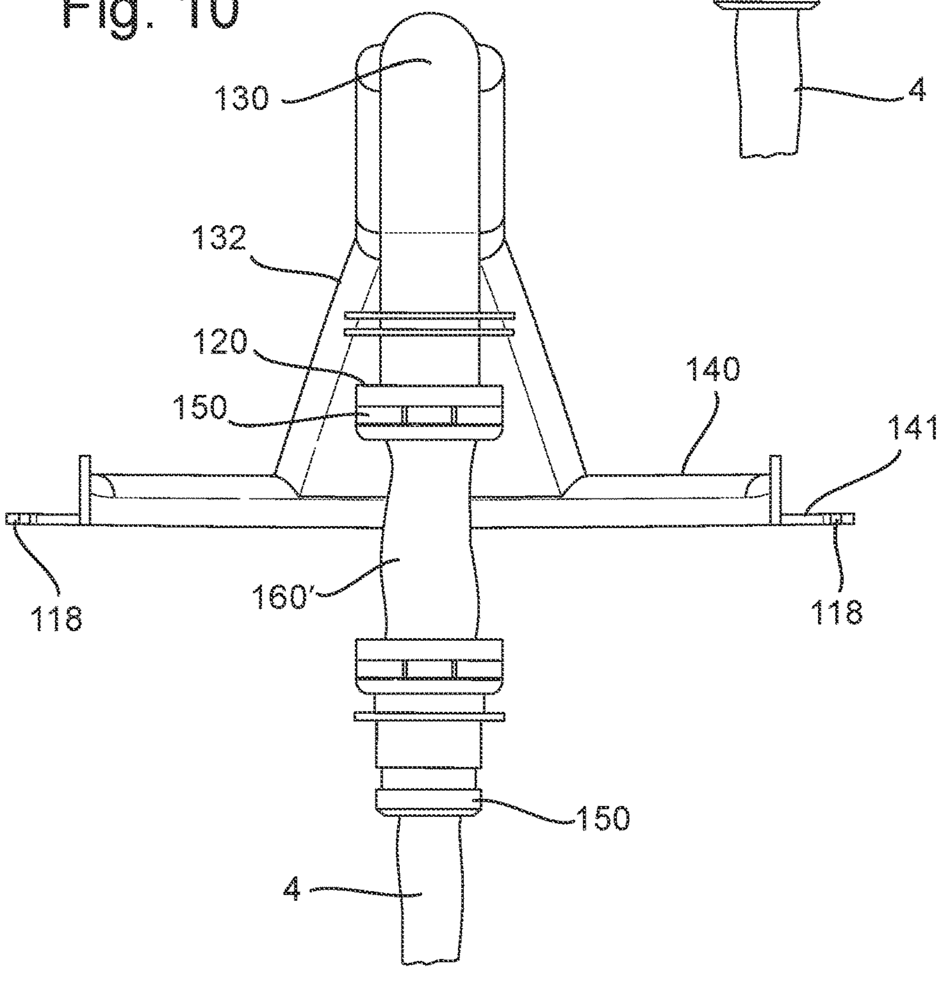
FIG. 10 shows the intermediate component of FIG. 8, viewed from the rear.
Figure 11:
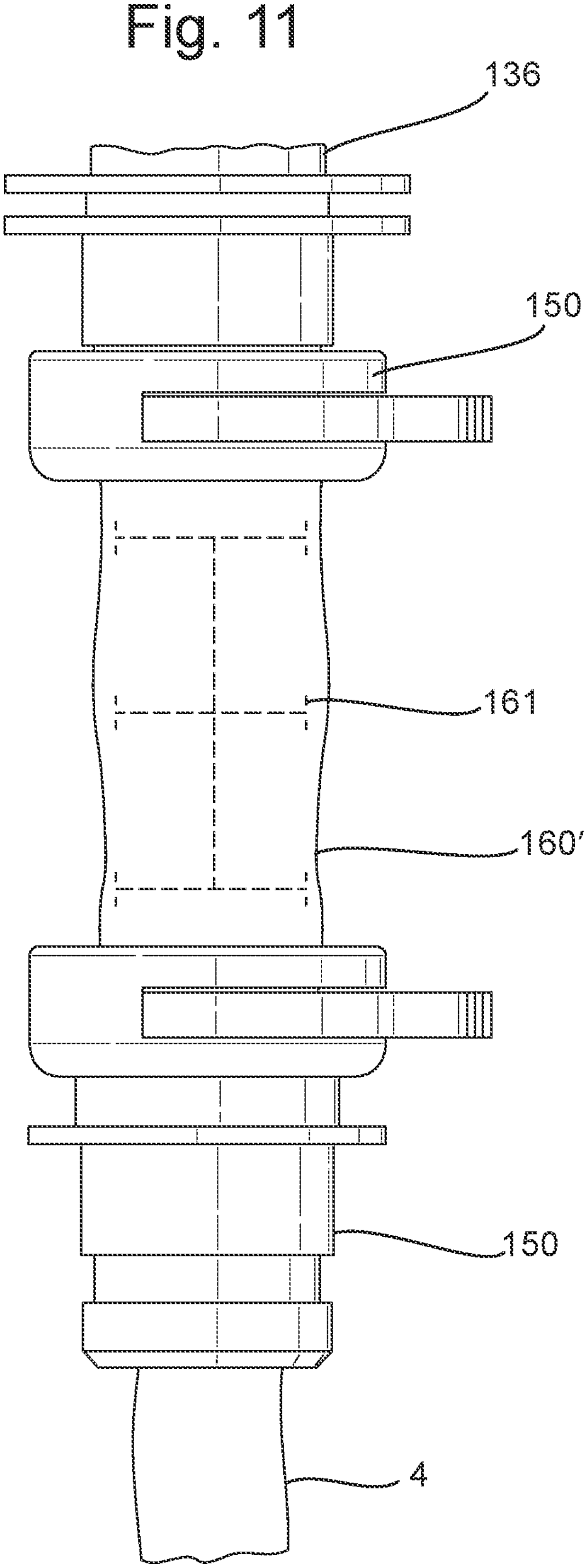
FIG. 11 shows the closeup schematic of the intermediate component of FIG. 8 centred on a vibration decoupler thereof.

Referring now to FIG. 1 there is shown a respirator 1. The respirator 1 comprises an air supply unit 2. The air supply unit 2 comprises a battery-powered air blower, fitted with an internal filter so that it in use atmospheric air is taken in by the air supply unit, and delivered at increased pressure to flow from the air supply units output 3. The air supply unit 2 mounts to a belt 5 to be conveniently worn on the body of a user of the respirator 1. The respirator 1 comprises powered air-purifying respirator type.

Air from the outlet 3 of the air supply unit 2 is received by a tube 4. An interface component cooperates 100 with headgear 200 to deliver air that is received from the tube 4 to the user of the respirator 1, for breathing by the user. The interface component 100 comprises an internal conduit through which air from the tube 4 at the rear the user's head passes, to be delivered to the front of the user's head, within the headgear 200.

The headgear 200 comprises a cradle 210 for interfacing with a user's head, and by which the headgear 200 is supported in use. The headgear 200 also comprises a face covering 220 from within which the user breathes. The face covering 220 comprises a fabric hood 221, and a transparent visor portion 222 for the user the user to see through. The interface component 100 is coupled to the tube 4, receives air from the tube 4 and delivers said air within the face covering 220. As can be appreciated from the shape, the interface component 100 locates over the user's head in use, within the hood 221.

The interface component 100 by which air is delivered within the face covering 220 enables enhanced ergonomics for the headgear 200 and as a consequence for the respirator 1 overall. In the example embodiment of FIG. 1, the tube 4 and cradle 210 are not integral or otherwise directly connected with one another, instead being connected structurally and for air delivery via the interface component 100. Such construction means that these components can be separately specified for a range of different potential users of the respirator 1, such as users having different face and head proportions, facilitating manufacture. As the interface component 100 does not touch or otherwise directly engage the user, a single component can be produced which cooperates with headgear formed of cradle 210 and face covering 220 of different sizes for different potential users, with a consistent interface provided for the tube 4.

Features of the interface component 100 enable the interface component 100 of FIGS. 2 through 7 to be mounted to the cradle 210 and tube 4 in a releasable manner.

Referring now to FIGS. 2 through 7 and 18 through 20, the interface component 100 comprises cradle-engaging fastenings 110, 112, 114. The interface component 100 and cradle 210 each comprise portions of releasable and re-couplable fastenings that in use to cooperate with each other to mount the interface component 100 to the cradle 210, as described in more detail below.

The cradle 210 comprises threaded bars 211 that extend radially away from the users head, in this example from the area of the users temples. The threaded bars 211 are either integral with the cradle 210, or are provided by separate bolts that thread through the cradle 210 and engage suitable footings in the cradle 210. The cradle-engaging fastenings 110, 112 are threaded onto the bars 211 and nuts 212 provided to clamp the cradle 210 and interface component 100 to one another. A secure, yet releasable fastening is thus provided. The fastening is stable, with connections at either side of the cradle 210, and resistant to relative rotation as the surfaces of the cradle-engaging fastenings 110, 112 and the interface component abut one another.

Further stability is provided by the cradle-engaging fastening 114 at the rear of the interface component 100. The cradle 210 comprises a size adjuster 216 for changing its effective circumference, to enable a good fit on a range of different head sizes. The cradle-engaging fastening 114 of the interface component 100 mounts the interface component to the cradle 210 at the size adjuster 216, giving a three-point connection between the components. The cradle engaging-fastening 114 comprises an abutment which accepts a bracket 116. The bracket 116 connects between the size adjuster 216 of the cradle 210 and cradle-engaging fastening 114 at the rear of the interface component 100, as a 90-degree angle bracket held in place vertically by the abutment of the cradle-engaging fastening 114 and for example by a friction fit with said abutment horizontally.

The interface component 100 comprises a frame for supporting the face covering 220. The interface component 100 comprises an overhead branch 130 and a forehead branch 140. The interface component 100 is releasably mounted to the face covering 220 by face covering fastenings 118, 120 that couple the interface component to the face covering 220. The face covering fastenings 118 are provided as fixing bosses extending from the forehead branch 140 of the interface component 100, and in use cooperate with the face covering by a button-like action to be releasable and re-couplable. The position of the face covering fastenings 118 at the outward edge of an outwardly-projecting brim 141 of the forehead branch 140 serves to maintain effective spacing between the face covering 220 and the user's face.

As described in more detail below, the tube 4 is either releasably connected to the interface component at tube fastenings elements 150 of the interface component 100, or to interface component 110 and the face covering 220 in a combined connection 120, 150. The interface component 110 and tube 4 comprise separately or together releasable and re-couplable fastening elements 150 that cooperate to releasably mount the interface component 110 to the tube 4, and optionally to the face covering 220.

The overhead branch 130 comprises a single main air conduit therethrough, with internal cross-section that narrows from the rear, toward the front, along part of its length. In this narrowing portion 131, flow accelerates through the conduit, for better delivery from the forehead branch, as will be described later. The shape of the central part of the overhead branch 130, which comprises a generally flattened internal and external cross-section, reduces the overhead clearance needed for the respirator. The shaping of overhead branch 130 also services to quieten the low of air through the conduit avoiding abrupt pressure changes associated with sharp bends and changes in cross section. The narrowing portion 131 may transition along its length so as to narrow in the vertical direction, with a corresponding smaller increase in width in another direction, such as the horizontal direction to achieve a suitable reduction in overall cross-sectional area To further reduce the noise of air moving through and discharging from the interface component 100, bleed holes 135 are provided in the narrowing portion 131 of the overhead branch 130. In the examples show in the Figures, the bleed holes 135 open toward the user's head. The bleed holes 135 reduce pressure in the interface component 100, and provide cooling airflow to the top of the user's head. The bleed holes 135, and the movement of airtherethrough and over their apertures serves to change the general flow pattern of air passing through the narrowing portion 131 of the overhead branch 130 to further reduce noise. The bleed holes 135 are angled to pass through the wall of the narrowing portion 131 of the overhead branch 130 with the airflow therethrough making an acute angle to the direction of airflow in the overhead branch 130. This arrangement has been found to be particularly effective in reducing noise. Bleed holes with a cross section of around 3 mm diameter have been found effective in reducing noise, for typical flow rates expected in a respirator as described.

Delivery of air from the interface component 100 takes place by diverging the flow in a divergent portion 132 of the overhead branch 130. The divergent portion 132 is arranged to feed air to the forehead branch 140. In the embodiments shown, the overhead branch 130 comprises a divergent portion 132 which is fan-shaped. The divergent portion 132 is divergent in the width direction, but may conveniently be of constant height away from the head to maintain clearance, and further curved around the contour of the forehead to match the curve of the forehead branch 140. The forehead branch 140 comprises a vent 142 for delivery of air from the interface component 100 within the face covering 220. In the embodiments shown in the Figures a single vent 142 that is relatively wide is provided, in order to facilitate discharge therefrom.

The vent 142 is generally divergent toward its open end, and comprises at its extremity a bevelled edge 143. The bevelled edge 143 provides a further degree of local divergence at the edge of the vent 142, at the interface with the brim 141 of the forehead branch 140. The divergence toward the open end of the vent, both large and small on account of the general shape and the bevelled edge respectively, services to control discharge from the vent 142 to produce quiet operation, and to avoid a potentially irritating direct curtain of air impinging on the user's face.

In the examples shown in the Figures, the interface component 100 is mounted to the tube 4 such that the tube 4 approaches the interface component 100 in a vertically upward direction, generally parallel to the user's back. In this configuration, in embodiment with air supply unit 2 mounted to a belt 5, the tube 4 is conveniently routed to directly approaches the interface component 100, and to align and connection generally co-linearly with a rising part 136 of the overhead branch 130 of the interface component 100. By providing an interface at a rising part 136 of the overhead branch 130, the tube 4 increased user comfort may be experienced, as the weight of the tube 4 acts on the headgear 200 with minimal additional turning moment from a horizontally extending part of the tube that would otherwise project away from the user's head and produce a torque thereon due to its weight.

FIGS. 8 through 13 and 20 show an example respirator 1 that comprises a vibration decoupler 160, 160', or show component elements thereof. Vibrations arise in the tube 4 because of the action of the air supply unit 2, and/or from the action of movement of air within the tube 4. The vibration decoupler 160 is provided between the air supply unit 2 and the interface component 110. By providing a vibration decoupler, vibration from the air supply unit 2 and/or tube 4 is not passed through the respirator to the user, meaning that the respirator is quieter for the user.

In the examples shown, the vibration decoupler 160 is provided between the tube 4 and the interface component 110, as a convenient position to decouple the interface component 100 from vibrations passing along the tube 4.

Figure 12:
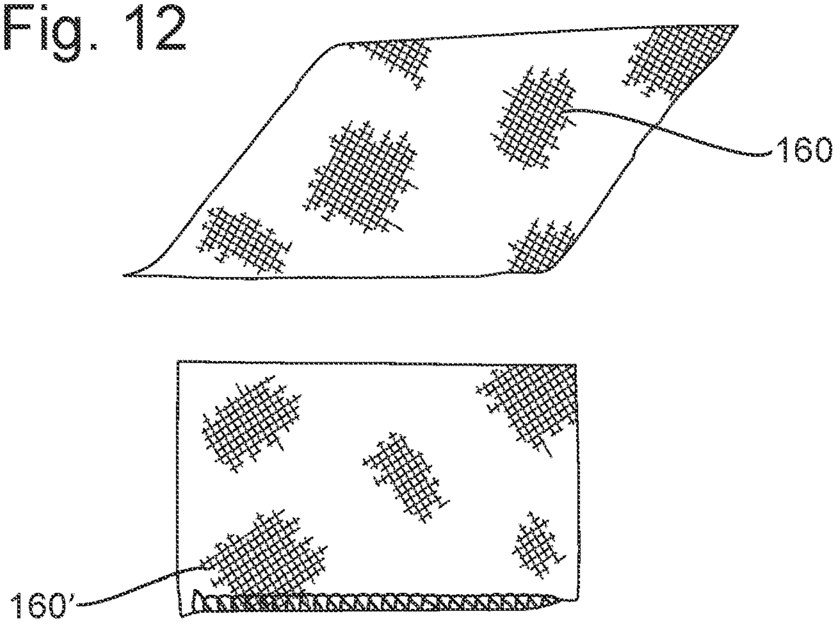
FIG. 12 shows first and second example vibration decoupler tubes, for use in a vibration decoupler according to an example embodiment.

The vibration decoupler 160 comprises a thin, pliable fabric tube, formed from a flat pattern piece. FIG. 12 shows two vibration decouplers 160, 160', flattened to form the shape of a parallelogram and a rectangle respectively. The vibration decouplers 160, 160' are respectively formed by welding a seam along the edges of a pattern piece, and by sewing the edges of a pattern piece.

Figure 13:
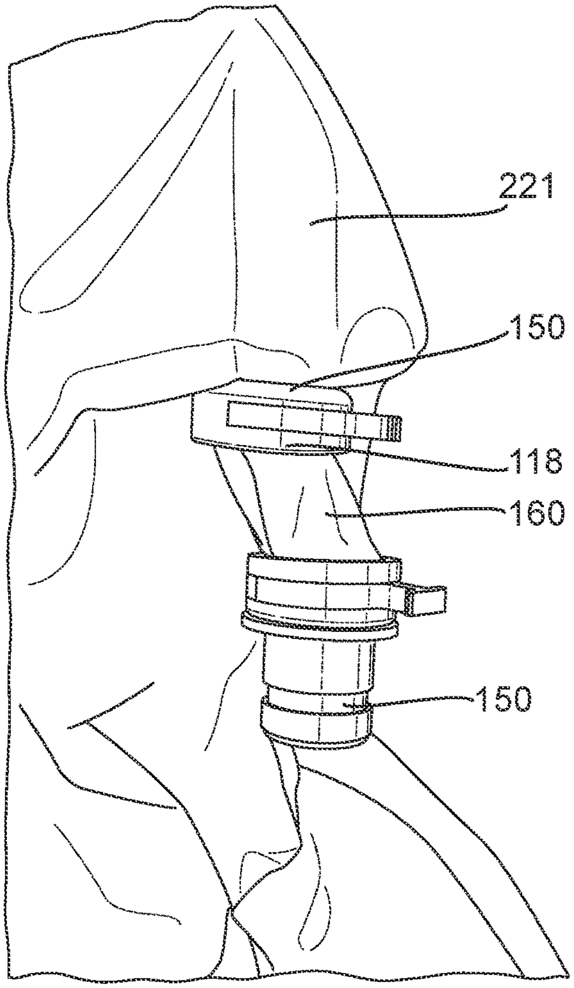
FIG. 13 shows the second example vibration decoupler according to an example embodiment, in use with headgear of a respirator.
Figure 14:
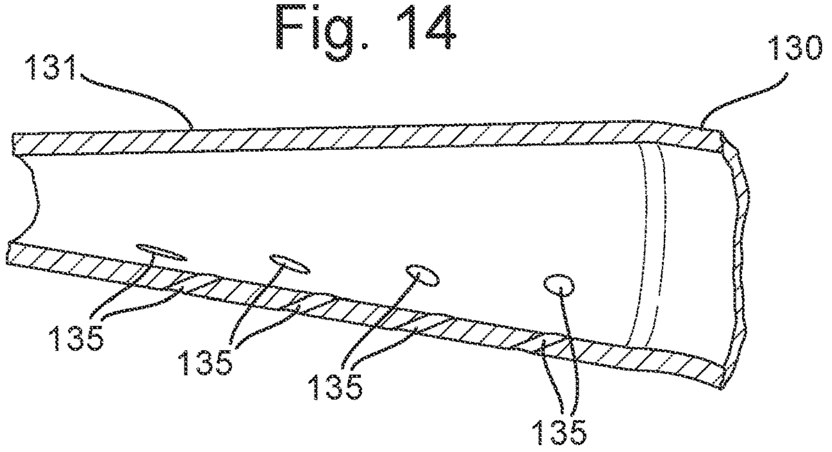
FIG. 14 shows a partial sectional view revealing interior detail of the intermediate component of FIG. 2.
Figure 15:
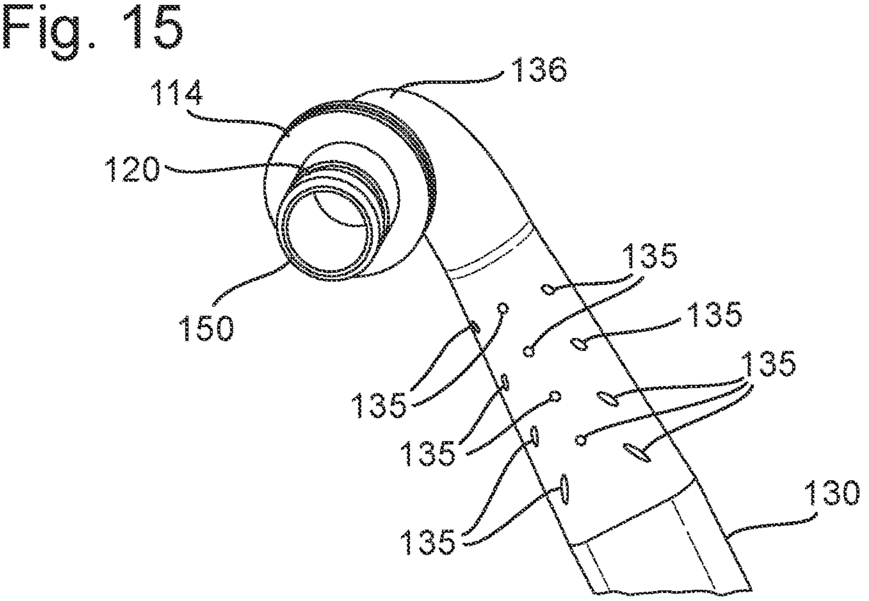
FIG. 15 shows a partial view of the rear, underside aspect of the overhead branch of the intermediate component of FIG. 2.
Figure 16:
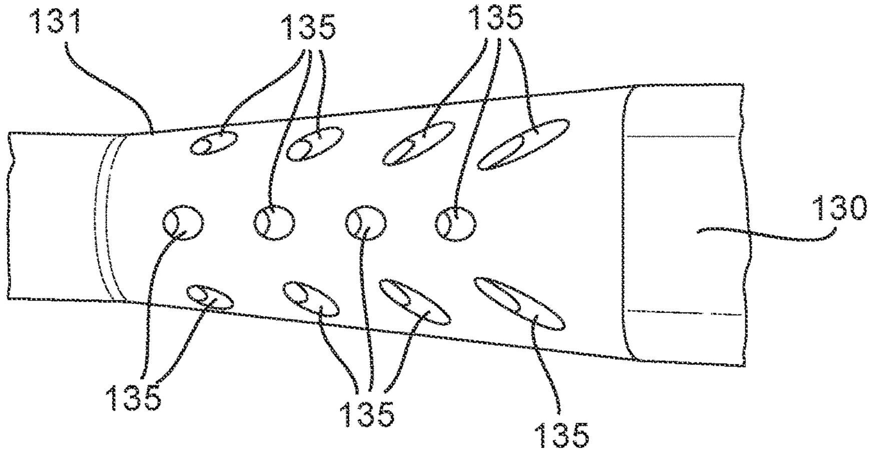
FIG. 16 shows a partial close-up view of the overheard branch of the intermediate component of FIG. 2
Figure 17:
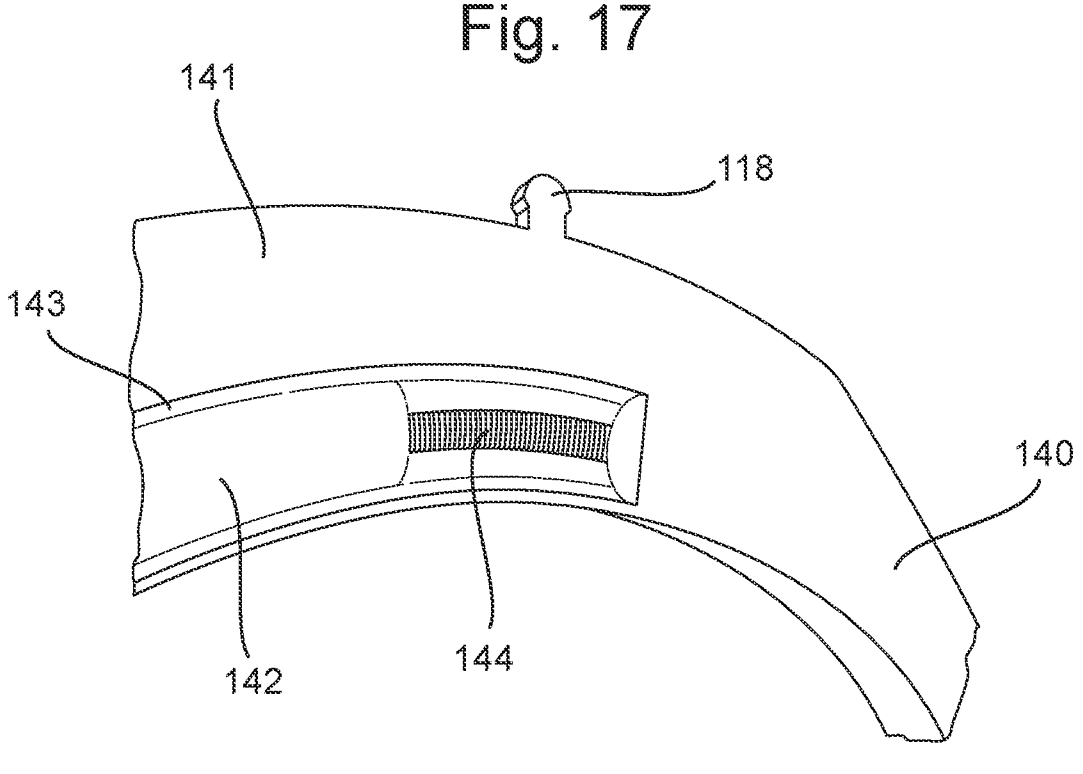
FIG. 17 shows a partial close-up perspective view of the forehead branch of the intermediate component of FIG. 2
Figure 18:
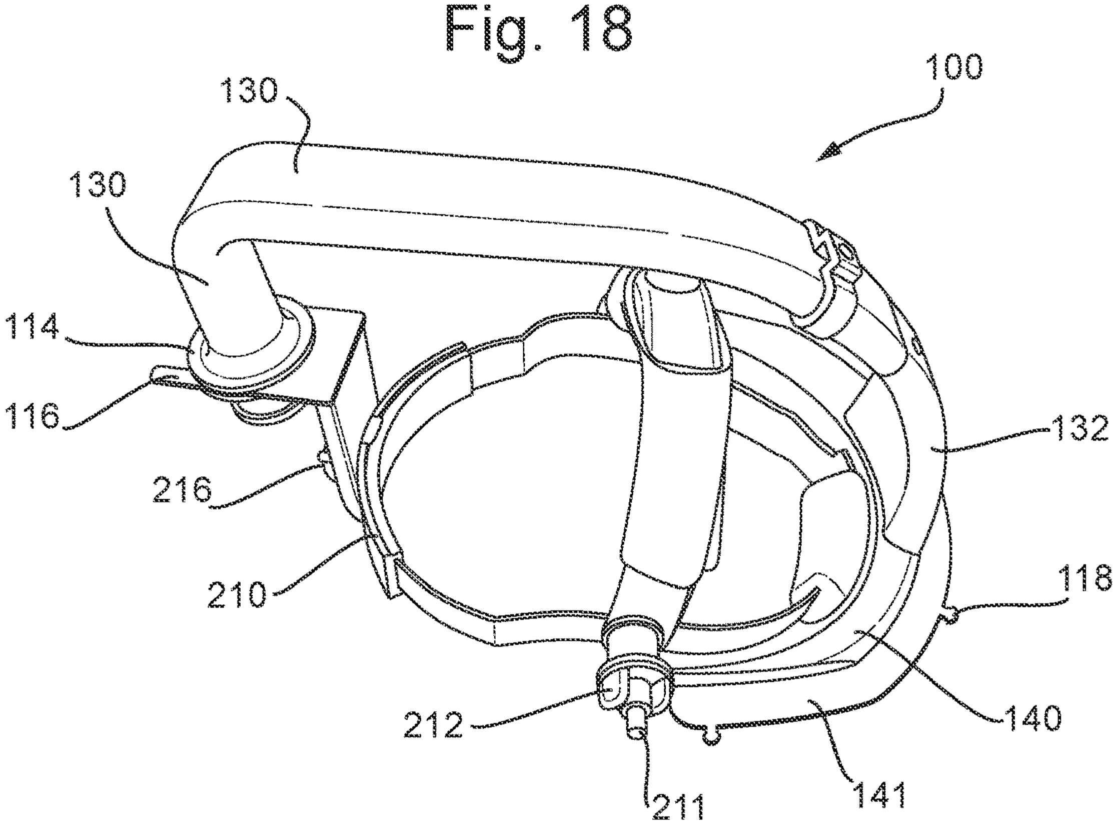
FIG. 18 shows a side view of an intermediate component according to another example embodiment mounted on a cradle.
Figure 19:
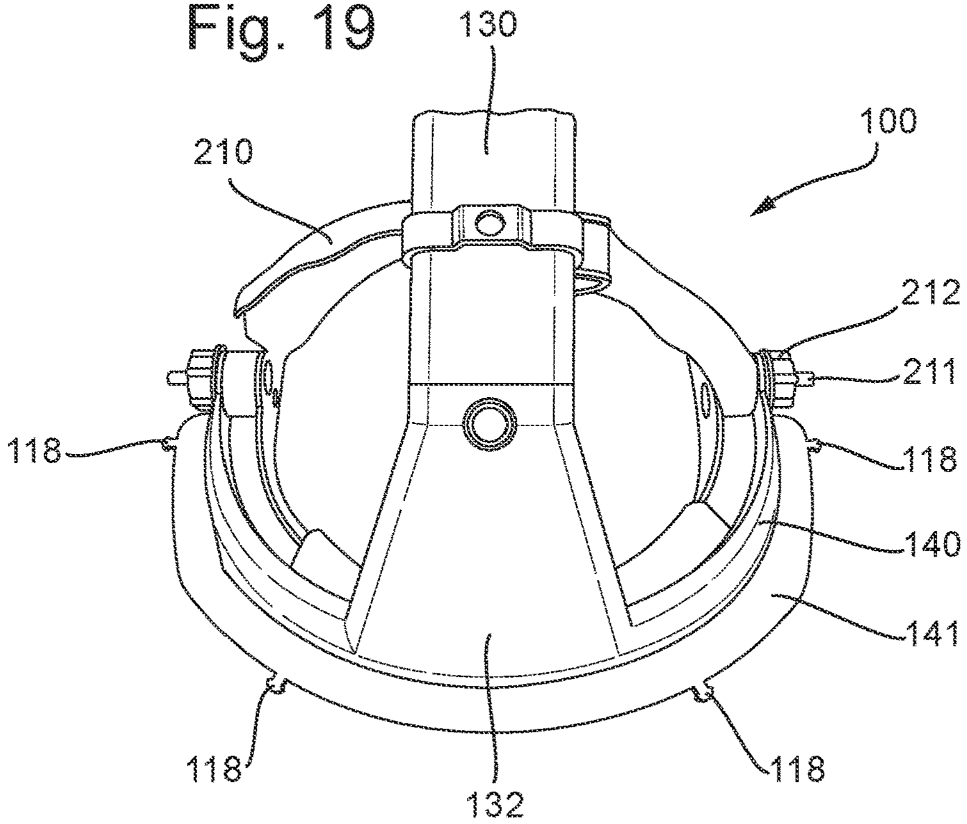
FIG. 19 shows a partial front view of the intermediate component of FIG. 18 mounted on a cradle.
Figure 20:
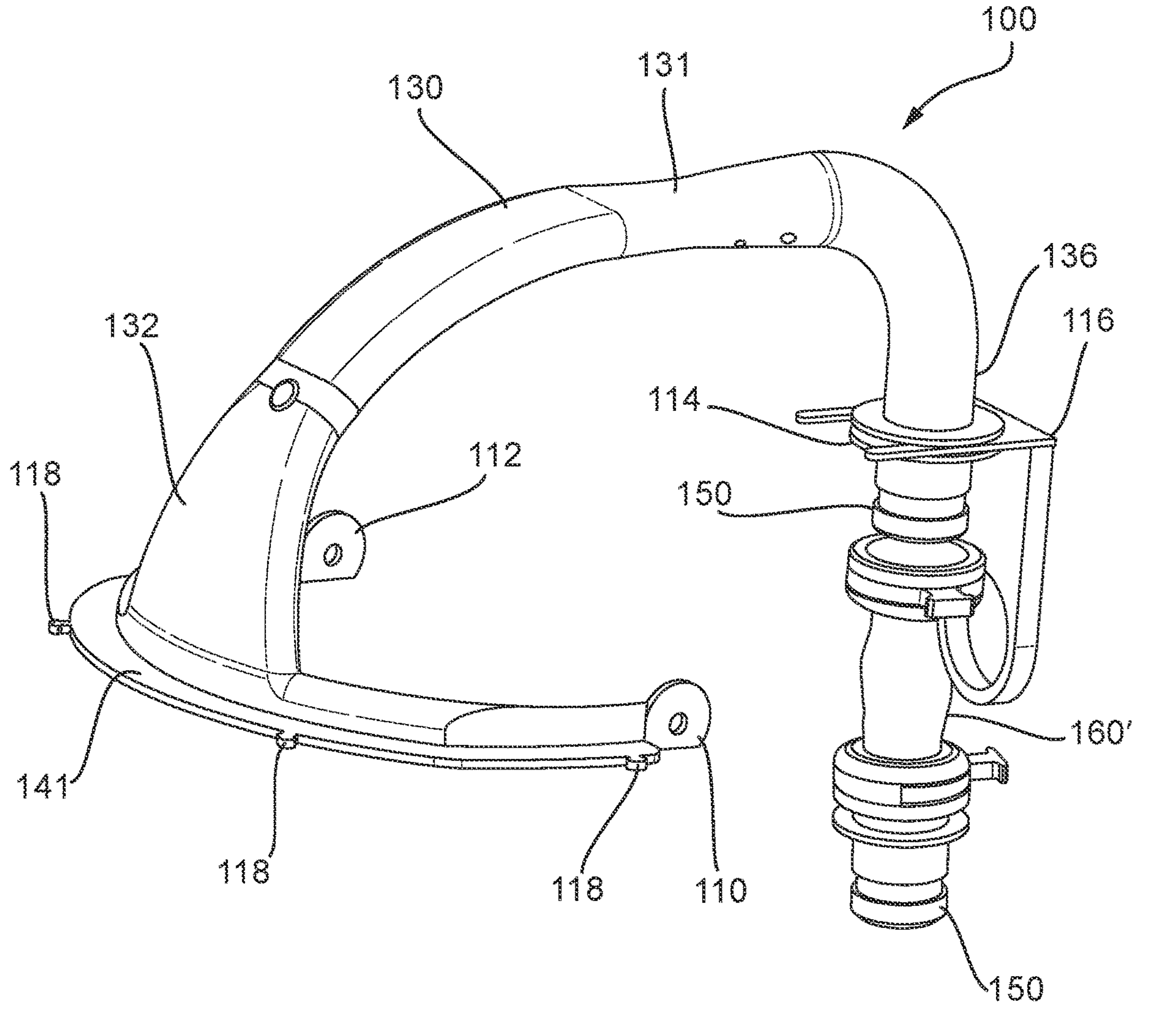
FIG. 20 shows a respirator according to another example embodiment.

The vibration decoupler 160, comprises offset first and second open ends. As shown in FIG. 13, this enables a vertical arrangement of the tube 4 as it interfaces the interface component 100 at the tube fastening 150, and continuing up through the vibration decoupler to the interface component 110, but with a lateral offset to keep the tube 4 in an ergonomic arrangement away from the user's neck without requiring the tube 4 to bend. As shown schematically in FIG. 11, the vibration decoupler 160' comprises an internal spacer 161 to prevent collapse thereof. The spacer 161 is internal to the tube of the vibration decoupler 160', and is coupled thereto without bridging contact across the tube 4 and the interface component 100.

The respirator 1 is suitable for use in method of assembly where a relatively smaller range of headgear size options, such as a range that comprises only a large size hood and a small sized hood, can be made to work effectively for the majority of users by specifying an adjustable cradle, and by specifying an interface component that is either personally sized and manufactured by ALM or similar, or from a range of sizes with finer granularity.

As has been described herein, the respirator and associated methods offer a range of wearability enhancements, considering noise and other ergonomic factors, and are flexible to be readily adapted to users of different proportions and sizes, as well as accommodating different cleaning and other serviceability factors required for respirator components.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or before this specification in connection with this application and which are open to public inspection with this specification, and the contents of all such papers and documents are incorporated herein by reference.

All the features disclosed in this specification (including any accompanying claims, abstract and drawings), and/or all the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A respirator comprising:

an air supply unit arranged to deliver air at its output and configured to be worn or carried proximate a user's waist;

headgear comprising a cradle configured to interface with a user's head, and a face covering from within which the user breathes;

a first tube to receive air from the air supply unit;

an interface component to receive air from the first tube and to deliver said air within the face covering; and a vibration decoupler, provided between the first tube and the interface component, such that in use vibrations from the air supply unit and first tube are reduced, wherein the vibration decoupler comprises a tube of non self-supporting material, the non self-supporting material comprising an airtight fabric, wherein the tube of non self-supporting material has a lower bending stiffness than the first tube, and wherein the first tube is longer than the tube of non self-supporting material.

2. The respirator of claim 1, wherein the vibration decoupler comprises a spacer or stent within the tube of non self-supporting material, so as to prevent collapse of the tube of non self-supporting material.

3. The respirator of claim 1, wherein the tube of non self-supporting material of the vibration decoupler is configured to be engaged with the first tube and interface component by tube fastening elements, said tube fastening elements being linked together to prevent twisting, flexing or collapsing of the non self-supporting material.

4. The respirator according to claim 1, wherein the interface component provides a frame for supporting the face covering, and comprises an overhead branch and a forehead branch.

5. The respirator according to claim 4, wherein the overhead branch comprises an internal conduit, to receive air from the first tube at the rear the user's head and to deliver said air to the front of the user's head.

6. The respirator of claim 5, wherein the forehead branch comprises a vent arranged to deliver airflow over the face of the user in a generally downward direction, from in front and above the face of the user.

7. The respirator of claim 5, wherein the forehead branch comprises a vent with a bevelled edge, the bevel providing a local divergence toward the open end of the vent.

8. The respirator of claim 1, wherein the first tube approaches the vibration decoupler and interface component in a direction generally parallel to a user's back, aligned with a rising part of the overhead branch of the interface component.

9. The respirator of claim 2, wherein the internal spacer or stent is coupled in place within the tube of non self-supporting material, without bridging contact across the first tube and the interface component.

10. The respirator of claim 1, wherein the air supply unit is configured to be carried by a belt to be worn on a user's body.

11. A method of reducing vibrational noise in a respirator assembly, the method comprising coupling a vibration decoupler between an air supply tube and an interface component, the interface component configured to deliver air within a face covering of the respirator by locating over the user's head in use, said air being provided via the air supply tube, wherein said vibration decoupler is configured to reduce vibrational noise from the air supply tube to the interface component wherein the vibration decoupler comprises a tube of non self-supporting material, the non self-supporting material comprising an airtight fabric, wherein the tube of non self-supporting material has a lower bending stiffness than the air supply tube, wherein the air supply tube is longer than the tube of non self-supporting material, and wherein the air supply tube approaches the tube of non self-supporting material in a direction generally parallel to a user's back, and couples to the tube of non self-supporting material proximate to the back of a user's head and/or neck.

12. A respirator comprising:

an air supply unit arranged to deliver air at its output and configured to be worn or carried proximate a user's waist;

headgear comprising a cradle configured to interface with a user's head, and a face covering from within which the user breathes;

a first tube to receive air from the air supply unit;

an interface component to receive air from the tube and to deliver said air within the face covering; and a vibration decoupler comprising a second tube and provided between the first tube and the interface component, such that in use vibrations from the air supply unit and first tube are reduced, wherein the second tube of the vibration decoupler comprises a non self-supporting material, wherein the second tube has a lower bending stiffness than the first tube, and wherein the first tube is longer than the second tube.

13. The respirator of claim 12, wherein the non self-supporting material comprises an airtight fabric.

14. The respirator of claim 12, wherein the vibration decoupler comprises a stent or external support to prevent collapse thereof in use.

15. The respirator of claim 12, wherein the vibration decoupler is configured to be engaged with the first tube and interface component by tube fastening elements, said tube fastening elements being linked together to prevent twisting, flexing or collapsing of the non self-supporting material.

16. The respirator according to claim 12, wherein the interface component provides a frame for supporting the face covering, and comprises an overhead branch and a forehead branch, wherein the overhead branch comprises an internal conduit.

17. The respirator of claim 16, wherein the forehead branch comprises a vent arranged to deliver airflow over the face of the user in a generally downward direction, from in front and above the face of the user.

18. The respirator of claim 16, wherein the forehead branch comprises a vent with a bevelled edge, the bevel providing a local divergence toward the open end of the vent.

19. The respirator of claim 12, comprising an internal spacer or stent that is B coupled in place within the second tube, without bridging contact across the first tube and the interface component.

20. The respirator of claim 12, wherein the air supply unit is configured to be carried by a belt to be worn on a user's body.

* * * * *